(12) United States Patent
Song et al.

(10) Patent No.: US 8,817,636 B2
(45) Date of Patent: Aug. 26, 2014

(54) METHOD, SYSTEM, AND EQUIPMENT FOR INFORMATION PROCESSING

(75) Inventors: Weiwei Song, Beijing (CN); Yinghui Yu, Beijing (CN); Lei Wan, Beijing (CN); Xin Xiong, Beijing (CN); Yuan Xia, Beijing (CN); Xiaorui Zheng, Chengdu (CN); Xiaotao Ren, Beijing (CN); Jingdong Peng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 13/283,208

(22) Filed: Oct. 27, 2011

(65) Prior Publication Data
US 2012/0039260 A1 Feb. 16, 2012

Related U.S. Application Data

(63) Continuation of application No. PCT/CN2009/071487, filed on Apr. 27, 2009.

(51) Int. Cl.
*H04L 1/00* (2006.01)
*H04W 4/00* (2009.01)
*H04J 1/00* (2006.01)
*H04W 36/00* (2009.01)
*H04L 1/18* (2006.01)
*H04W 36/14* (2009.01)

(52) U.S. Cl.
CPC ......... *H04W 36/0005* (2013.01); *H04L 1/1812* (2013.01); *H04L 2001/0093* (2013.01); *H04W 36/14* (2013.01); *H04L 1/0045* (2013.01)
USPC ........... 370/249; 370/332; 370/338; 370/343; 455/436

(58) Field of Classification Search
CPC ....... H04W 4/00; H04W 28/02; H04W 36/00; H04W 36/0005; H04W 36/0055; H04W 36/0016; H04W 36/08; H04W 36/14; H04W 36/16; H04W 36/20; H04W 36/22; H04B 1/00; H04B 7/0417
USPC ................. 370/229–238, 249–252, 310–350, 370/437–439; 455/431–448; 709/223–229
See application file for complete search history.

(56) References Cited

U.S. PATENT DOCUMENTS

2004/0203468 A1* 10/2004 Dent et al. ................. 455/67.14
(Continued)

FOREIGN PATENT DOCUMENTS

| CN | 101034961 A | 9/2007 |
| CN | 101047967 A | 10/2007 |

(Continued)

OTHER PUBLICATIONS

Written Opinion of the International Searching Authority in corresponding PCT Application No. PCT/CN2009/071487 (Feb. 4, 2010).

(Continued)

*Primary Examiner* — Tri H Phan
(74) *Attorney, Agent, or Firm* — Leydig, Voit & Mayer, Ltd.

(57) ABSTRACT

A method, a system, and equipment for information processing are provided. The method includes receiving information sent by a source eNodeB of UE, where the information includes processing status information and data information which are obtained after the source eNodeB processes data transmitted by the UE, or data information in at least two user plane protocol stacks of the source eNodeB, or data information in user plane protocol stacks except PDCP in the source eNodeB; and correspondingly, transmitting data with the UE according to the processing status information and data information, or the data information in the at least two user plane protocol stacks, or the data information in user plane protocol stacks except PDCP.

20 Claims, 14 Drawing Sheets

(56) References Cited

U.S. PATENT DOCUMENTS

| | | | |
|---|---|---|---|
| 2008/0107054 A1 | 5/2008 | Parts et al. | |
| 2008/0108354 A1* | 5/2008 | Nagata | 455/438 |
| 2009/0061878 A1* | 3/2009 | Fischer | 455/436 |
| 2009/0203383 A1* | 8/2009 | Shen et al. | 455/450 |
| 2009/0233611 A1* | 9/2009 | Olsson et al. | 455/446 |
| 2010/0151861 A1* | 6/2010 | Nagata et al. | 455/436 |
| 2010/0173659 A1* | 7/2010 | Shin et al. | 455/500 |
| 2010/0238903 A1* | 9/2010 | Kitazoe | 370/332 |
| 2011/0026444 A1* | 2/2011 | Dai et al. | 370/294 |
| 2011/0235603 A1* | 9/2011 | Cheng et al. | 370/329 |
| 2011/0268077 A1* | 11/2011 | Wan et al. | 370/329 |
| 2012/0033624 A1* | 2/2012 | Luo et al. | 370/329 |
| 2012/0254682 A1* | 10/2012 | Wan et al. | 714/748 |

FOREIGN PATENT DOCUMENTS

| | | |
|---|---|---|
| CN | 101047979 A | 10/2007 |
| CN | 101052213 A | 10/2007 |
| CN | 101114992 A | 1/2008 |
| CN | 101247643 A | 8/2008 |
| CN | 101389119 A | 3/2009 |
| WO | WO 2008023814 A2 | 2/2008 |

OTHER PUBLICATIONS

"3GPP TSG RAN WG1—3$^{rd}$ Generation Partnership Project; Discussion on Timing Advance issuein CoMP & Text Proposal," Feb. 2009, meeting #59, agenda item 12.2, 3$^{rd}$ Generation Partnership Project, Valbonne, France.

3GPP TS 36.423—3$^{rd}$ Generation Partnership Project; Technical Specification Group Radio Access Network; Evolved Universal Terrestrial Radio Access Network (EUTRAN); X2 application protocol (X2AP) (Release 8), Jun. 2008, Version 8.2.0, 3$^{rd}$ Generation Partnership Project, Valbonne, France.

3GPP TR 36.814—3$^{rd}$ Generation Partnership Project; Technical Specification Group Radio Access Network; Further Advancements for E-UTRA Physical Layer Aspects (Release 9), Feb. 2009, Version 0.4.1, 3$^{rd}$ Generation Partnership Project, Valbonne, France.

1$^{st}$ Office Action in corresponding Korean Patent Application No. 10-2011-7027618 (Jul. 10, 2013).

International Search Report in corresponding PCT Application No. PCT/CN2009/071487 (Feb. 4, 2010).

1$^{st}$ Office Action in corresponding Chinese Patent Application No. 200980126917.3 (Aug. 3, 2012).

Search Report in corresponding Chinese Patent Application No. 200980126917.3 (Jul. 25, 2012).

* cited by examiner

METHOD, SYSTEM, AND EQUIPMENT FOR INFORMATION PROCESSING

CROSS-REFERENCE TO RELATED APPLICATIONS

This application is a continuation of International Application No. PCT/CN2009/071487, filed on Apr. 27, 2009, which is hereby incorporated by reference in its entirety.

FIELD OF THE INVENTION

The present invention relates to communication technologies, and in particular, to a method, a system, and equipment for information processing.

BACKGROUND OF THE INVENTION

In a communication system, user equipment (UE), an evolved NodeB (eNodeB), and an access point (Access Point, AP) are included. The AP is a node including at least a radio frequency transceiver, and may be configured with a single antenna element or multiple antenna elements. One AP may be connected to one eNodeB. Multiple APs distributed in different locations may also be connected to one eNodeB. For example, in a coordinated multi-point transmitting/receiving (Coordinated Multi-Point, CoMP) system, multiple APs are connected to one eNodeB, which may coordinately transmit data and receive data from UE; these coordinating APs may be from the same eNodeB or from different eNodeBs. The UE may select an AP to access network and communicate with a peer end through the eNodeB.

Data transmission between the UE and the eNodeB in a hybrid automatic repeat request (HARQ) process is performed by using a user plane protocol stack. Referring to FIG. 1, the user plane protocol stack includes: a Packet Data Convergence Protocol (PDCP) layer, a radio link control (RLC) layer, a media access control (MAC) layer, and a physical layer (PHY). Taking that the UE sends data to the eNodeB as an example, specifically, the transmission is performed through the following manner: Data sent at a UE side is forwarded to the RLC layer after processed at the PDCP layer; the data processed by the RLC layer is forwarded to the MAC layer for processing, which continues until the highest layer in the user plane protocol stack at the UE side processes and sends the data to the eNodeB; at an eNodeB side, the PDCP layer receives and processes the data sent by the UE, which continues until the highest layer in the user plane protocol stack at the eNodeB side processes the received data and then sends a feedback message to the UE. Arrows in FIG. 1 indicate a path of the data transmission.

Generally, a cell (cell) may include one or multiple APs. When the UE moves between cells, the UE needs to select a cell to serve for the UE. In some systems, for example, a CoMP system, the UE selects multiple cells to serve for the UE. That is, the UE selects a cell as a serving cell (serving cell) to bear some control information (such as, scheduling information, PHY layer configuration parameters, and feedback information). Other cells providing only service information are called cooperating cells (cooperating cell). An eNodeB where the serving cell is located is a serving eNodeB (serving eNB) of the UE, and an eNodeB of other cooperating cells is a non-serving eNodeB (non-serving eNB).

When the UE moves between multiple cells, the UE is handed over between cells. In the prior art, during the UE is handed over between cells, a data forwarding channel is created between an eNodeB (hereinafter referred to as a source eNodeB) where a source serving cell of the UE is located and an eNodeB (hereinafter referred to as a target eNodeB) where a target serving cell of the UE is located. The source eNodeB sends data, for example, unnumbered data packet and correctly transmitted data in a service data unit (SDU) at the PDCP layer which are sent by the UE and received at the PDCP layer, to the target eNodeB, but the data transmission is not performed between the UE and the source eNodeB and between the UE and the target eNodeB; after the UE is handed over to a target cell, the data transmission is continued between the UE and the target eNodeB. In this way, in a handover process of the UE, a user plane is generally interrupted for 27.5 ms.

During the implementation and research of the present invention, the inventor of the present invention finds that message processing in the prior art has at least the following problem.

In the handover process, the source eNodeB sends unprocessed data received at the highest layer of the user plane protocol stack, that is, the PDCP layer, to the target eNodeB. In this way, a PDCP PDU section (RLC PDU) that has been correctly sent by the source eNodeB needs to reprocess the data at the target eNodeB.

SUMMARY OF THE INVENTION

Embodiments of the present invention provide a method, a system, and equipment for information processing, which reduces data loss during handover.

An embodiment of the present invention provides an information processing method. The method includes:

receiving information sent by an eNodeB where a source serving cell of a UE is located, where the information includes: processing status information and data information which are obtained after the eNodeB where the source serving cell is located processes data that is transmitted by the UE, or data information in at least two user plane protocol stacks of the eNodeB where the source serving cell is located, or data information in user plane protocol stacks except PDCP in the eNodeB where the source serving cell is located;

correspondingly, transmitting data with the UE according to the processing status information and data information, or the data information in the at least two user plane protocol stacks, or the data information in use plane protocol stacks except PDCP.

An embodiment of the present invention provides an information processing method. The method includes:

receiving a handover request acknowledge message or sending a target handover command;

sending information to an eNodeB where a target serving cell of a UE is located, where the information includes: processing status information and data information which are obtained after the eNodeB where the source serving cell is located processes data that is transmitted by the UE, or data information in at least two user plane protocol stacks of the eNodeB where the source serving cell is located, or data information in user plane protocol stacks except PDCP in the eNodeB where the source serving cell is located; and instructing the eNodeB where the target serving cell is located to perform corresponding processing.

An embodiment of the present invention provides an information processing method. The method includes:

receiving information sent by a UE and performing joint decoding on the information sent by the UE;

obtaining result information about the joint decoding; and sending the result information about the joint decoding to a serving eNodeB of the UE.

An embodiment of the present invention provides an information processing method. The method includes:

receiving information sent by a UE and performing joint decoding on the information sent by the UE;

receiving result information about the joint decoding sent by at least one non-serving eNodeB of the UE, where the joint decoding is performed on the information sent by the UE; and returning a feedback message to the UE according to the result information about the joint decoding, where the non-serving eNodeB performs the joint decoding on the information sent by the UE, and/or result information about joint decoding, where a serving eNodeB performs the joint decoding on the information sent by the UE.

An embodiment of the present invention provides an eNodeB. The eNodeB includes:

a source information receiving unit, configured to receive information sent by an eNodeB where a source serving cell of a UE is located, where the information includes: processing status information and data information which are obtained after the eNodeB where the source serving cell is located processes data that is transmitted by the UE, or data information in at least two user plane protocol stacks of the eNodeB where the source serving cell is located, or data information in user plane protocol stacks except PDCP in the eNodeB where the source serving cell is located; and an information transmitting unit, configured to transmit data with the UE according to the information received by the source information receiving unit.

An embodiment of the present invention provides an eNodeB. The eNodeB includes:

a handover generating unit, configured to receive a handover request acknowledge message or sending a target handover command; and a source information sending unit, configured to send information to an eNodeB where a target serving cell of a UE is located, where the information includes: processing status information and data information which are obtained after the eNodeB where the source serving cell is located processes data that is transmitted by the UE, or data information in at least two user plane protocol stacks of the eNodeB where the source serving cell is located, or data information in user plane protocol stacks except PDCP in the eNodeB where the source serving cell is located; and instruct the eNodeB where the target serving cell is located to perform corresponding processing.

An embodiment of the present invention provides an eNodeB. The eNodeB includes:

a receiving decoding unit, configured to receive information sent by a UE and perform joint decoding on the information sent by the UE;

a result receiving unit, configured to receive result information sent by at least one non-serving eNodeB of the UE, where the joint decoding is performed on the information sent by the UE; and a feedback returning unit, configured to return a feedback message to the UE according to the result information about the joint decoding, where the result information about the joint decoding is received by the result receiving unit, and the joint decoding is performed by the non-serving eNodeB on the information sent by the UE, and/or the result information about the joint decoding, where the joint decoding is performed by the receiving decoding unit on the information sent by the UE.

An embodiment of the present invention provides an eNodeB. The eNodeB includes:

a second receiving decoding unit, configured to receive information sent by a UE and perform joint decoding on the information sent by the UE;

a result obtaining unit, configured to obtain result information about the joint decoding performed by the second receiving decoding unit; and a result sending unit, configured to send the result information about the joint decoding to a serving eNodeB of the UE, where the result information about the joint decoding is obtained by the result obtaining unit.

An embodiment of the present invention provides an information processing system. The system includes: an eNodeB where a source serving cell is located and an eNodeB where a target serving cell is located.

The eNodeB where the source serving cell is located is configured to receive a handover request acknowledge message or send information to the eNodeB where the target serving cell of a UE is located after sending a target handover command, where the information includes: processing status information and data information which are obtained after the eNodeB where the source serving cell is located processes data that is transmitted by the UE, or data information in at least two user plane protocol stacks of the eNodeB where the source serving cell is located, or data information in user plane protocol stacks except PDCP in the eNodeB where the source serving cell is located.

The eNodeB where the target serving cell is located is configured to receive information sent by the eNodeB where the source serving cell of the UE is located, and transmit data with the UE according to the information sent by the eNodeB where the source serving cell of the UE is located.

An embodiment of the present invention provides an information processing system. The system includes: a serving eNodeB and at least one non-serving eNodeB.

The non-serving eNodeB is configured to receive information sent by a UE and perform joint decoding on the information sent by the UE; obtain result information about the joint decoding; and send the result information about the joint decoding to the serving eNodeB of the UE.

The serving eNodeB is configured to receive information sent by the UE and perform joint decoding on the information sent by the UE; receive the result information about the joint decoding, where the result information about the joint decoding is sent by at least one non-serving eNodeB of the UE, and the joint decoding is performed on the information sent by the UE; and return a feedback message to the UE according to the result information about the joint decoding, where the non-serving eNodeB performs the joint decoding on the information sent by the UE, and/or the result information about the joint decoding, where the serving eNodeB performs the joint decoding on information sent by the UE.

In embodiments of the present invention, an information processing method during UE handover is: A source eNodeB sends to a target eNodeB: processing status information and data information which are obtained by processing data transmitted by a UE, or data information in at least two user plane protocol stacks of the source eNodeB, or data information in user plane protocol stacks except PDCP in the source eNodeB; and the target eNodeB transmits data with the UE according to the information. In this way, compared with the prior art where the source eNodeB sends only original data received at the highest layer, that is PDCP layer, to the target eNodeB, with the method in the embodiments of the present invention, during the handover, data loss of the processing status information and data information which are obtained after each user plane protocol stack of the source eNodeB processes the data transmitted by the UE is reduced.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings described in the following are only some embodiments of the present invention, and persons skilled in the art may also derive other drawings from these accompanying drawings without any creative effort.

DETAILED DESCRIPTION OF THE EMBODIMENTS

The technical solutions in the embodiments of the present invention are described in the following with reference to the accompanying drawings in the embodiments of the present invention. Obviously, the embodiments to be described are only a part of rather than all embodiments of the present invention. Based on the embodiments of the present invention, all other embodiments obtained by those skilled in the art without making any creative effort shall fall within the protection scope of the present invention.

Data transmission between eNodeBs described in the following may be implemented through an interface (X2) between the eNodeBs.

Method Embodiment 1

Figure 1:
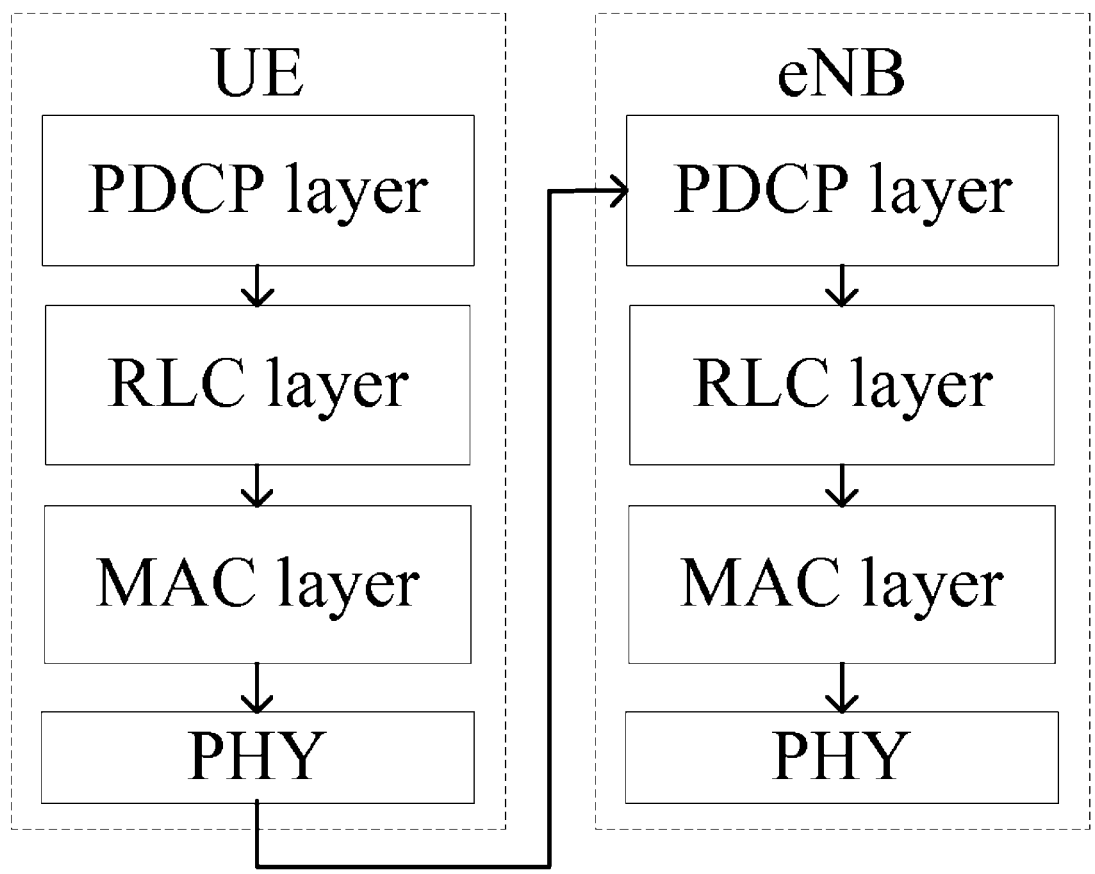
FIG. 1 is a schematic diagram showing a logical structure of a user plane protocol stack in data transmission between a UE and an eNodeB according to the prior art.
Figure 2:
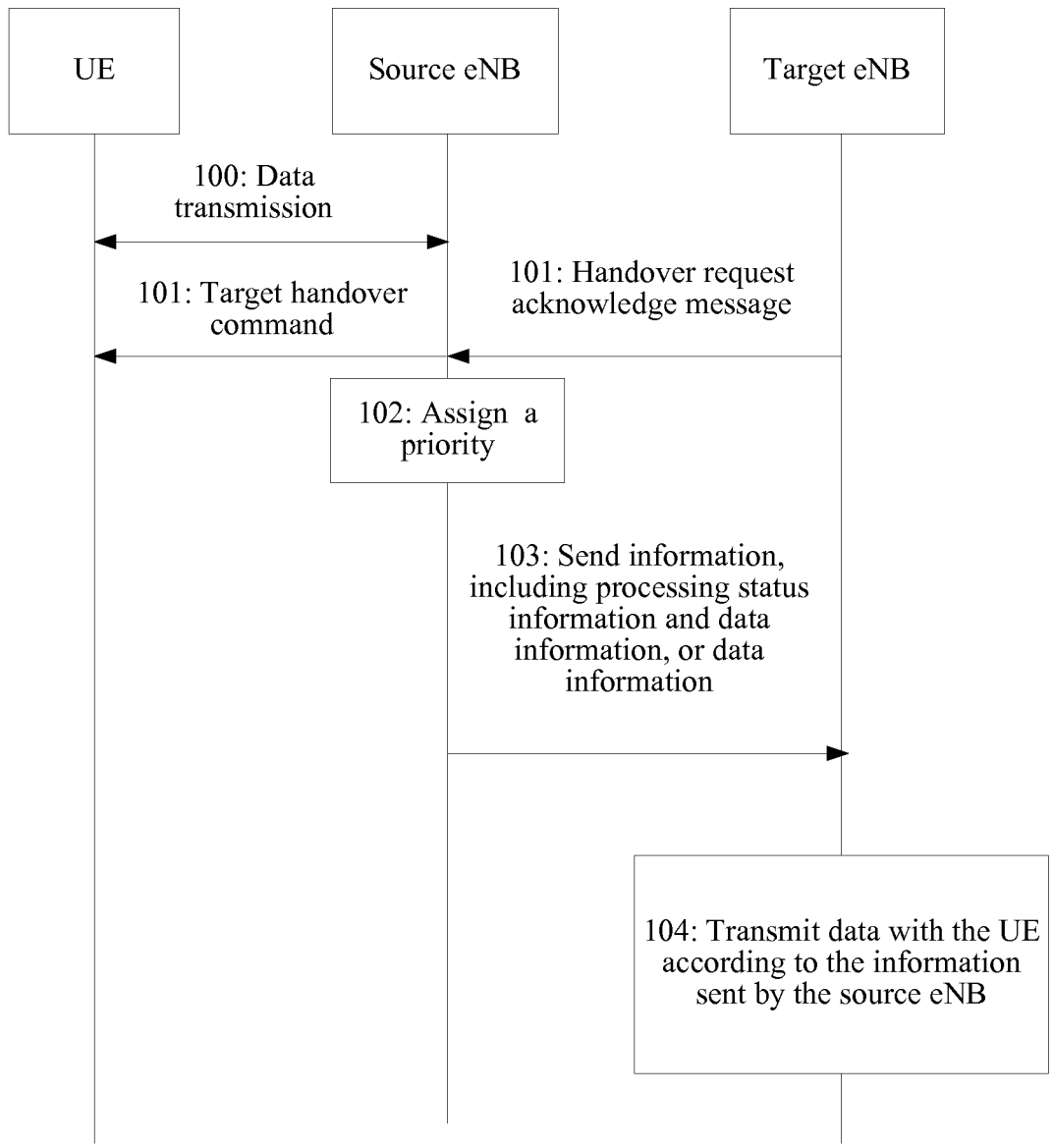
FIG. 2 is a flowchart of an information processing method according to a first method embodiment of the present invention.

An information processing method in this embodiment of the present invention is applicable to data transmission in an HARQ process between a UE and an eNodeB. FIG. 2 is a signaling flowchart of information processing in a method for UE handover between cells. The method includes:

Step 100: Data is transmitted between a UE and an eNodeB (a source eNodeB) where a source serving cell is located.

The data is transmitted between the source eNodeB and the UE at an MAC layer in an HARQ process. A process from data transmitting to a feedback message receiving is referred to as one HARQ transmission process.

When data is received at uplink, each user plane protocol stack of the source eNodeB, that is, PDCP, RLC, MAC, and PHY layers, processes data sent by the UE. For example, a PDCP SDU receives the data sent by the UE, allocates a sequence number (SN) of the layer to the data, performs encryption and/or integrity protection to form protocol data unit (PDU) data of the PDCP layer, and forwards the data to the RLC layer. The RLC layer allocates an SN of the layer to an RLC SDU (PDCP PDU), and performs operations such as encapsulation, segmentation, and cascading to obtain data satisfying a requirement of an RLC protocol stack, that is, the RLC PDU.

Step 101: The source eNodeB receives a handover request acknowledge message sent by an eNodeB (a target eNodeB) where a target serving cell of the UE is located, or the source eNodeB sends a target handover command to the UE at downlink.

For the UE, during the handover, information and context in the MAC, RLC, and PDCP layers are not discarded. Especially, data packets in an MAC PDU in the HARQ process are not discarded.

Step 103: The source eNodeB forwards information to the target eNodeB, where the information includes: processing status information and data information which are obtained after the source eNodeB processes data that is transmitted by the UE, or data information in at least two user plane protocol stacks of the source eNodeB, or data information in user plane protocol stacks except the PDCP layer in the source eNodeB.

During the handover, the data information forwarded by the source eNodeB to the target eNodeB may include any one or more kinds of the following information: new data that is allocated with no SN and buffered at the PDCP layer, and PDCP SDU data for which a correctly received acknowledge is not received; data that is allocated with no SN and buffered at the RLC layer, unprocessed RLC SDU data at the RLC layer (indicating that a corresponding RLC PDU is generated without relevant operations being performed at the RLC layer), and RLC PDU data for which a correctly received acknowledge is not received from the UE, which includes a data packet without feedback or a data packet with an NACK as a feedback; data that is allocated with no SN and buffered at the MAC layer, unprocessed MAC SDU data at the MAC layer (indicating that a corresponding MAC PDU is generated without relevant operations being performed at the MAC layer); a data packet being received in the HARQ process, for example, correctly decoded MAC PDU and an incorrectly decoded data packet at the physical layer; and MAC PDU data being transmitted in the HARQ process.

During the handover, the processing status information forwarded by the source eNodeB to the target eNodeB may include any one or more kinds of the following information: PDCP PDU SN (HARQ processing SN) incorrectly received in the PDCP layer, and context information in the PDCP layer; context information (context) generated in the RLC layer, and RLC PDU SN incorrectly received in the RLC layer; related status information being transmitted in the HARQ process, for example, a process identifier (HARQ processing ID), current transmission times (CURRENT_TX_NB), currently used multiple channel select (MCS), modulation coding mode, scheduling information, a time sequence relation or starting time of round-trip time (RTT) in the current HARQ, a redundancy version (RV), and information about an allocated time frequency resource block (RB); related information being received in the HARQ process, for example, a process identifier, current transmission times, currently used MCS, modulation coding mode, scheduling information, a time sequence relation and starting time of an RTT in the current HARQ, an RV, and information about an allocated time frequency RB.

Step 104: The target eNodeB receives information sent by the source eNodeB of the UE, and transmits data with the UE according to the received processing status information and data information which are obtained by processing the data transmitted by the UE, or the data information in at least two user plane protocol stacks of the eNodeB where the source serving cell is located, or the data information in user plane protocol stacks except PDCP in the eNodeB where the source serving cell is located.

Specifically, the received information is forwarded to each user plane protocol stack correspondingly, and the user plane protocol stack performs corresponding processing according to the corresponding information.

For downlink transmission of the UE, if the target eNodeB receives the new data that is allocated with no SN and buffered in the PDCP layer, and/or does not receives the PDCP SDU data for which no correctly received acknowledge is received, the target eNodeB performs corresponding processing on the data in the PDCP layer. For example, if the target eNodeB receives the new data that is allocated with no SN and buffered in the PDCP layer, the PDCP layer of the target eNodeB needs to allocate an SN to the new data, and forwards the PDCP SDU data allocated with the SN to the RLC layer; if the target eNodeB receives the PDCP SDU data for which no correctly received acknowledge is received in the PDCP layer, the target eNodeB waits for feedback (ACK/NACK) indicating a receiving status of the UE, for example, a receiving and acknowledge message fed back by the RLC layer.

If the target eNodeB receives new RLC SDU data that is allocated with no SN and buffered in the RLC layer; and/or the context information (context) generated in the RLC layer; and/or dose not receives the RLC PDU data for which no correctly received acknowledge returned by the UE is received, which includes a data packet without feedback or a data packet that is fed back as an NACK; the target eNodeB forwards the data to the RLC layer for corresponding processing. For example, if the new RLC SDU data that is allocated with no SN and buffered in the RLC layer is received, the RLC SDU data is segmented, cascaded, and encapsulated into proper RLC PDU data according to the size (TB size) and number (Num) of an apply data packet in the MAC layer; if the RLC PDU data returned by the UE for which no acknowledge message is received is received, which includes a data packet without feedback, or a data packet that is fed back as an NACK, the data packet is retransmitted or waits for the UE's feedback message (ACK/NACK).

If the target eNodeB receives new MAC SDU data that is allocated with no SN and buffered in the MAC layer, and/or MAC PDU and related information of the MAC PDU which are being transmitted in the HARQ process, the target eNodeB forwards the information to the MAC layer for corresponding processing. For example, if the target eNodeB receives the new MAC SDU data that is allocated with no SN and buffered in the MAC layer, according to a scheduling condition, the target eNodeB encapsulates the MAC SDU to obtain MAC PDU; if the target eNodeB receives the MAC PDU and related information of the MAC PDU which are being transmitted in the HARQ process, the target eNodeB performs a corresponding operation according to the time of the current HARQ process. For example, if an NACK that is fed back from the UE is received within an HARQ RTT, the MAC PDU is retransmitted to the UE in a next HARQ RTT. During the handover, if an interruption delay of the user plane is greater than the HARQ RTT, data needs to be retransmitted in one or multiple RTTs later. At this time, a default mode or explicit control signaling needs to be used to instruct the UE to receive the retransmitted data and/or a condition of resource usage during the data retransmission within several subsequent HARQ RTTs. This indication message may be carried in a dynamic indication message on a downlink packet data control channel (PDCCH) of the source eNodeB, or control data of the MAC layer, or radio resource control (RRC) signaling. Moreover, during this period, the UE does not receive a response message and also does not retransmit the data.

For example, if a feedback result (ACK or NACK) transmission time interval (TTI) of the UE falls within the interruption time of user plane handover, and the target eNodeB does not receive an ACK or NACK message indicating that the UE feeds back whether the MAC PDU is correctly received within the current HARQ RTT, the target eNodeB may retransmit the data in the current or next HARQ RTT, or does not retransmit the data but waits for the UE to retransmit the feedback message in the next HARQ RTT. At this time, the default mode or explicit control signaling needs to be used to instruct the UE to feed back the time and/or the condition of resource usage. This indication message may be transmitted through a dynamic indication message on a downlink packet data control channel (PDCCH) of the source eNodeB, or control data of the MAC layer, or RRC signaling.

It can be understood that in a specific embodiment:

Step 102 may be performed before step 103. The source eNodeB assigns a priority to information transmitted to the target eNodeB. When step 103 is executed, according to the priority, the information is transmitted to the eNodeB where the target serving cell of the UE is located. For example, the control signaling (including small data packets such as scheduling information and a feedback message) is assigned with a higher priority; and other service data may be assigned with different priorities or the same priority according to different service types. Priorities may also be assigned according to a condition of emergency and delay. A shorter transmission delay is required, the priority is higher. When the source eNodeB transmits the information to the target eNodeB, processing status information and data information which have a higher priority are transmitted first, and then other information with a lower priority is transmitted, which continues until information with the lowest priority is all transmitted to the target eNodeB.

Optionally, after the source eNodeB transmits information to the UE at downlink, the UE is handed over to a target cell. After the UE is handed over to the target cell, the target eNodeB needs to receive a feedback message of the UE. The feedback message is a message (for example, an ACK or an NACK) indicating that the UE feeds back the data that is received by the source eNodeB in the HARQ process before the handover. At this time, because there is an implicit mapping relationship between the resource used by the UE to transmit the control information on the downlink PDCCH of the source eNodeB and the resource used by the UE to feed back the information on the PUCCH of the source eNodeB, the source eNodeB needs to transmit the processing status information and data information, and may also send a first indication message to the target eNodeB through an interface (X2) between the eNodeBs, indicating information about the resource used by the target eNodeB to receive the feedback message (ACK or NACK) at uplink, or indicating information about the downlink resource used by the target eNodeB to transmit information in the HARQ process where the feedback message is received. According to the default implicit mapping relationship, the target eNodeB obtains information about the resource used for receiving the corresponding feedback message.

During the handover, an eNodeB for receiving the feedback information transmitted in the HARQ process during the handover, for example, the source eNodeB or the target eNodeB, may also be specified between the source eNodeB, the target eNodeB, and the UE by using a default mode. At this time, if the source eNodeB receives the feedback information in the HARQ process, the source eNodeB needs to forward the feedback information to the target eNodeB through the interface between eNodeBs.

Definitely, the UE may also give up to transmitting the feedback information, and feeds back the information to the target eNodeB in a next HARQ process. At this time, the target eNodeB needs to explicitly use the control signaling to indicate the information about the resource used for feeding back the ACK/NACK on the PUCCH.

Optionally, for uplink data transmission, if the UE needs to be handed over to the target serving cell after sending information to the source eNodeB, after the UE is handed over to the target cell, the target eNodeB may send feedback information to the UE. The feedback message is a message used for feeding back the received information sent by the UE before handover. At this time, because there is an implicit mapping relationship between the resource used by the UE to transmit data at uplink of the source eNodeB and the resource used by the UE to receive the feedback information (ACK/NACK) at downlink of the source eNodeB, the source eNodeB needs to send a first indication message to the target eNodeB, indicating information about the resource used for sending the feedback message at downlink to the UE, for example, a location and time for sending the feedback message on the PHICH; or indicating information about the uplink resource used by the target eNodeB to receive information in the HARQ process where the feedback information is sent. According to the default implicit mapping relationship, the target eNodeB obtains a condition of the resource used for sending the corresponding feedback information. The first indication message may be a dynamic indication message on a PDCCH of the source eNodeB, or control data of the MAC layer, or RRC signaling.

It can be understood that during the handover, an eNodeB for sending the feedback information transmitted in the HARQ process during the handover may be specified between the source eNodeB, the target eNodeB, and the UE by using the default mode. The eNodeB instructs the UE to feed back information, for example, the source eNodeB sends the feedback information in the HARQ process.

Definitely, the eNodeB may also give up to transmitting the feedback information, and feeds back the information to the UE in a next HARQ process. At this time, the target eNodeB needs to explicitly use the control signaling to indicate a condition of the resource used for feeding back the ACK/NACK on the PHICH.

It can be seen that, in this embodiment of the present invention, the information processing method during UE handover is: A source eNodeB sends to a target eNodeB: processing status information and data information which are obtained by processing data transmitted by a UE, or data information in at least two user plane protocol stacks of the source eNodeB, or data information in user plane protocol stacks except PDCP in the source eNodeB; the target eNodeB transmits data with the UE according to the information. In this way, compared with the prior art where the source eNodeB sends only original data received at the highest layer, that is a PDCP layer, to the target eNodeB, with the method in this embodiment of the present invention, during the handover, data loss of the processing status information and data information which are obtained after each user plane protocol stack of the source eNodeB processes the data transmitted by the UE is reduced.

Method Embodiment 2

Figure 3:
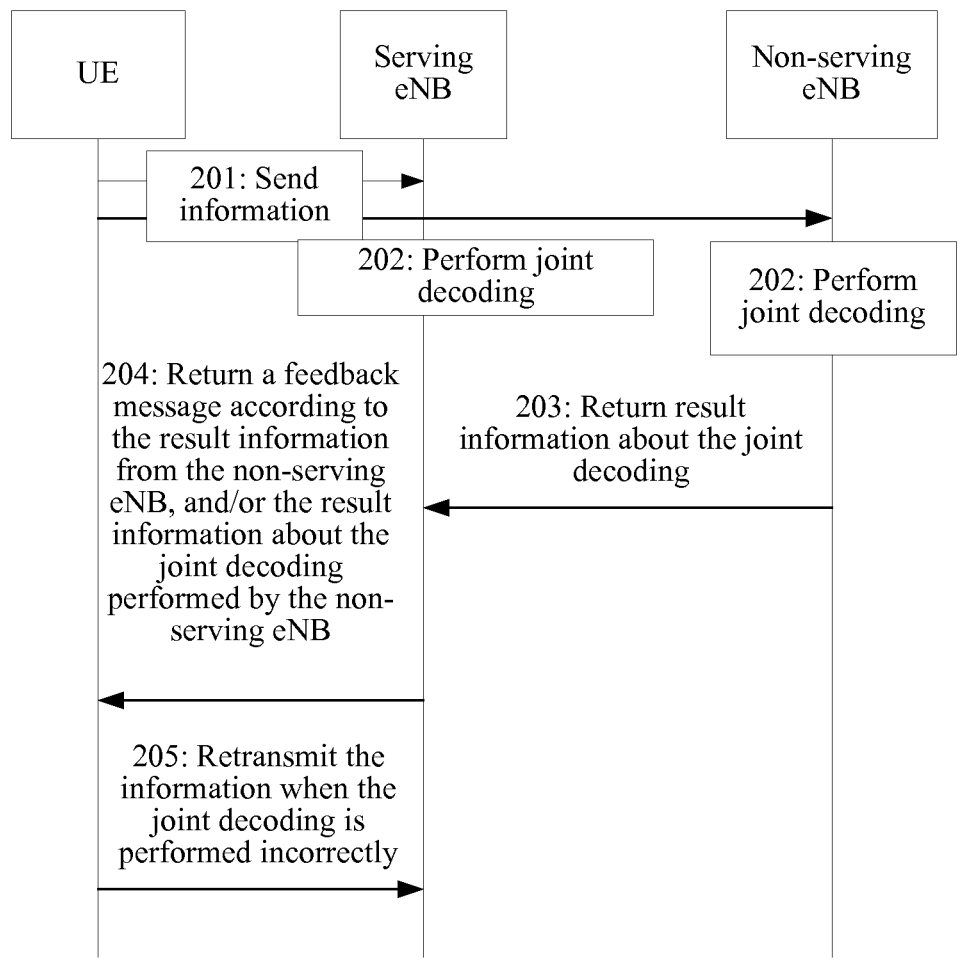
FIG. 3 is a flowchart of an information processing method according to a second method embodiment of the present invention.

An information processing method in this embodiment of the present invention may be applicable to a CoMP system. Multiple cells receive data sent by a UE concurrently and the multiple cells are located in different eNodeBs. FIG. 3 is a flowchart of the method. The method includes:

Step 201: A UE sends information, and multiple cells jointly receive the information sent by the UE concurrently. The multiple cells are located in different eNodeBs, that is, a serving eNodeB and non-serving eNodeBs.

Step 202: The serving eNodeB and the non-serving eNodeBs receive the information sent by the UE, and perform joint decoding.

It should be noted that in this specification, joint decoding performed by the serving eNodeB (or the non-serving eNodeBs) refers to that the serving eNodeB (or the non-serving eNodeBs) performs joint decoding on locally received information. In this specification, cross-eNodeB joint decoding performed by the non-serving eNodeB (or the serving eNodeB) refers to that the non-serving eNodeB (or the serving eNodeB) further performs joint decoding according to information received from other eNodeBs.

Step 203: The non-serving eNodeB returns result information about the joint decoding to the serving eNodeB.

If the joint decoding is performed correctly, the result information includes: indication information about correct joint decoding and/or information after correct joint decoding. If the joint decoding is performed incorrectly, the information includes: indication information about incorrect joint decoding and/or information before joint decoding.

Step 204: The serving eNodeB returns a feedback message to the UE according to the result information about the joint decoding, where the result information about the joint decoding is returned by the non-serving eNodeB, and the joint decoding is performed on the information sent by the UE, and/or result information about the joint decoding performed by the serving eNodeB.

If the joint decoding is correctly performed by the serving eNodeB, and/or the serving eNodeB receives an indication message indicating correct joint decoding performed by any non-serving eNodeB or information after correct joint decoding, the serving eNodeB sends a feedback message indicating correct joint decoding to the UE.

If the serving eNodeB receives indication information indicating incorrect joint decoding, where the indication information is sent by all non-serving eNodeBs, and the serving eNodeB incorrectly performs joint decoding on the information sent by the UE, the serving eNodeB sends a feedback message (NACK) indicating incorrect joint decoding to the UE, and requests the UE to retransmit the information.

Alternatively, if the serving eNodeB receives the information before joint decoding, where the information is sent by all the non-serving eNodeBs, and the serving eNodeB incorrectly performs joint decoding on the information sent by the UE, the serving eNodeB performs cross-eNodeB joint decoding on the received information before joint decoding, where the received information is sent by all the non-serving eNodeB. If a result of the cross-eNodeB joint decoding is incorrect, the serving eNodeB sends a feedback message (NACK) indicating incorrect joint decoding to the UE, and requests the UE to retransmit the information.

Step 205: The UE retransmits the information when receiving the feedback message indicating incorrect joint decoding.

In this embodiment of the present invention, when the multiple cells receiving the information sent by the UE are not located in the same eNodeB, after multiple eNodeBs receive the information sent by the UE, the serving eNodeB among the multiple eNodeBs sends a feedback message to the UE according to result information about joint decoding performed by the serving eNodeB and/or result information about joint decoding, where the result information about the joint decoding is returned by the non-serving eNodeB. Compared with the prior art where after the serving eNodeB performs joint decoding, the serving eNodeB returns a feedback message to the UE, in this embodiment, the serving eNodeB sends a feedback message to the UE according to the result information about the joint decoding, where the result information about the joint decoding is returned by the non-serving eNodeB only when the result information about the joint decoding is received, where the result information about the joint decoding is returned by the non-serving eNodeB. In this way, if most cells receiving information from the UE are located in the non-serving eNodeB, a correct rate of the joint decoding performed by the non-serving eNodeB is higher than that of the joint decoding performed by the serving eNodeB, thus increasing a decoding rate.

Furthermore, the non-serving eNodeB returns the result information about the joint decoding to the serving eNodeB. Compared with the prior art where all the non-serving eNodeBs send the received information sent by the UE to the serving eNodeB, because the size of the result information about the joint decoding is smaller than that of the information sent by the UE, in this embodiment, time of transmission between the eNodeBs is reduced, so that a process of information transmission between the UE and the eNodeB is shortened.

Method Embodiment 3

Figure 4:
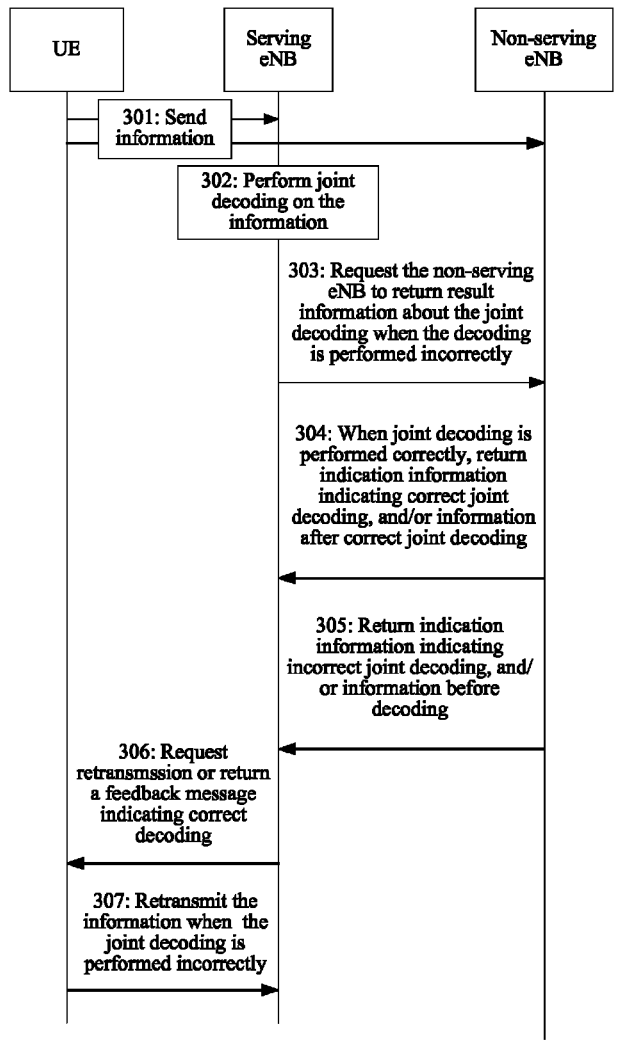
FIG. 4 is a flowchart of an information processing method according to a third method embodiment of the present invention.

An information processing method in this embodiment of the present invention may be applicable to a CoMP system. Multiple cells receive data sent by a UE concurrently and the multiple cells are located in different eNodeBs. FIG. 4 is a flowchart of the method. As specific implementation of the method embodiment 2, the method includes:

Step 301: A UE sends information, and multiple cells jointly receive the information sent by the UE concurrently. The multiple cells are located in different eNodeBs, that is, a serving eNodeB and a non-serving eNodeB.

Step 302: The serving eNodeB and non-serving eNodeB receive the information sent by the UE, and perform joint decoding. If the serving eNodeB determines that the joint decoding is performed incorrectly, step 303 is performed; if the joint decoding is performed correctly, a feedback message indicating correct joint decoding is returned to the UE.

It should be noted that in this specification, joint decoding performed by the serving eNodeB (or the non-serving eNodeB) refers to that the serving eNodeB (or the non-serving eNodeB) performs joint decoding on locally received information. In this specification, cross-eNodeB joint decoding performed by the non-serving eNodeB (or the serving eNodeB) refers to that the non-serving eNodeB (or the serving eNodeB) further performs joint decoding according to information received from other eNodeBs.

Step 303: The serving eNodeB sends a request to at least one non-serving eNodeB of the UE to request the non-serving eNodeB to return result information about the joint decoding performed on the information sent by the UE.

Step 304: The non-serving eNodeB receives the request from the serving eNodeB. If the joint decoding is performed correctly, the non-serving eNodeB returns an indication message indicating correct joint decoding, and/or information (MAC PDU) after correct decoding to the serving eNodeB. If the joint decoding is performed incorrectly, step 305 is performed.

It can be understood that the information after correct decoding and the indication message indicating correct decoding may be carried in one message and sent to the serving eNodeB through an X2 interface; or may also be carried in different messages and sent to the serving eNodeB. For example, first the indication message indicating correct joint decoding is sent to the serving eNodeB, the serving eNodeB may send a feedback message to the UE according to the indication message, and then the non-serving eNodeB forwards decoded information to the serving eNodeB.

Step 305: The non-serving eNodeB sends an indication message indicating incorrect joint decoding, and/or information before the joint decoding performed by the non-serving eNodeB to the serving eNodeB.

The information before joint decoding and the indication information indicating the incorrect joint decoding may be carried in one message and sent to the serving eNodeB through the X2 interface; or may also be carried in different messages and sent to the serving eNodeB. For example, first the indication information indicating incorrect joint decoding is sent to the serving eNodeB, the serving eNodeB may send a feedback message to the UE according to the indication message to request retransmission. The information before the decoding may be: information before Fast Fourier transform (FFT); information (pilot+data) after FFT and/or signal to interference plus noise ratio (SINR); data information after FFT and/or an estimated channel condition (H) and/or SINR; soft information after soft demodulation and/or SINR; and an output result during decoding. For example, Turbor decoding uses an iteration decoding principle, and may forward an output result after several times of iteration to the serving eNodeB.

Step 306: The serving eNodeB returns a feedback message to the UE according to the result information about the joint decoding, where the result information about the joint decoding is returned by the non-serving eNodeB, and the joint decoding is performed on the information sent by the UE, and/or result information about the joint decoding performed by the serving eNodeB.

If the serving eNodeB receives an indication message indicating correct joint decoding performed by any non-serving eNodeB and/or information after correct decoding, the serving eNodeB sends a feedback message indicating correct joint decoding to the UE.

If the serving eNodeB receives indication information indicating incorrect joint decoding, where the indication information is sent by all non-serving eNodeBs, the serving eNodeB sends a feedback message (NACK) indicating that the joint decoding is performed incorrectly to the UE, and requests the UE to retransmit the information.

Alternatively, if the serving eNodeB receives the information before joint decoding, where the information is sent by all the non-serving eNodeB, the serving eNodeB performs cross-eNodeB joint decoding on the received information before joint decoding, where the received information is sent by all the non-serving eNodeB. If a result of the cross-eNodeB joint decoding is incorrect, the serving eNodeB sends a feedback message (NACK) indicating incorrect joint decoding to the UE, and requests the UE to retransmit the information.

It should be noted that the serving eNodeB may forward an incorrect data packet after joint decoding to the non-serving eNodeB that retransmits data, and the non-serving eNodeB that retransmits data performs retransmission combination and joint decoding. It should be noted that after the non-serving eNodeB performs retransmission combination and joint decoding, sends the data packet to the serving eNodeB. A detailed method may be referred to the executing method for newly transmitting information (information received for the first time) in this embodiment.

When the serving eNodeB determines that returning the feedback message to the UE is delayed, the serving eNodeB may send a message to the UE, indicating the time for receiving the feedback message by the UE.

Step 307: The UE retransmits the information when receiving the feedback message indicating incorrect joint decoding.

It should be noted that, during information communication in this embodiment, an information sending party may assign a priority to information to be sent, and sends the information according to the priority. A detailed method for assigning the priority may be referred to the description in step 102 in the method embodiment 1, which is not described here again.

In this embodiment, after the serving eNodeB and the non-serving eNodeB receive the information sent by the UE, the serving eNodeB performs joint decoding. If the joint decoding is performed incorrectly, a request is sent to the non-serving eNodeB to request the non-serving eNodeB to return result information about the joint decoding performed on the information sent by the UE. When the serving eNodeB receives the result information about the joint decoding from the non-serving eNodeB, the serving eNodeB returns a feedback message indicating correct or incorrect joint decoding to the UE. This embodiment is detailed implementation of the method embodiment 2. When the serving eNodeB performs joint decoding correctly, the serving eNodeB may directly returns a feedback message to the UE, and a process of data transmission may be implemented without interaction between the eNodeBs. However, when the serving eNodeB performs joint decoding incorrectly, because the size of the result information about the joint decoding is smaller than that of the information sent by the UE, transmission time between the eNodeBs may be shortened, and therefore, a process of information transmission between the UE and the eNodeB is shortened.

Method Embodiment 4

Figure 5:
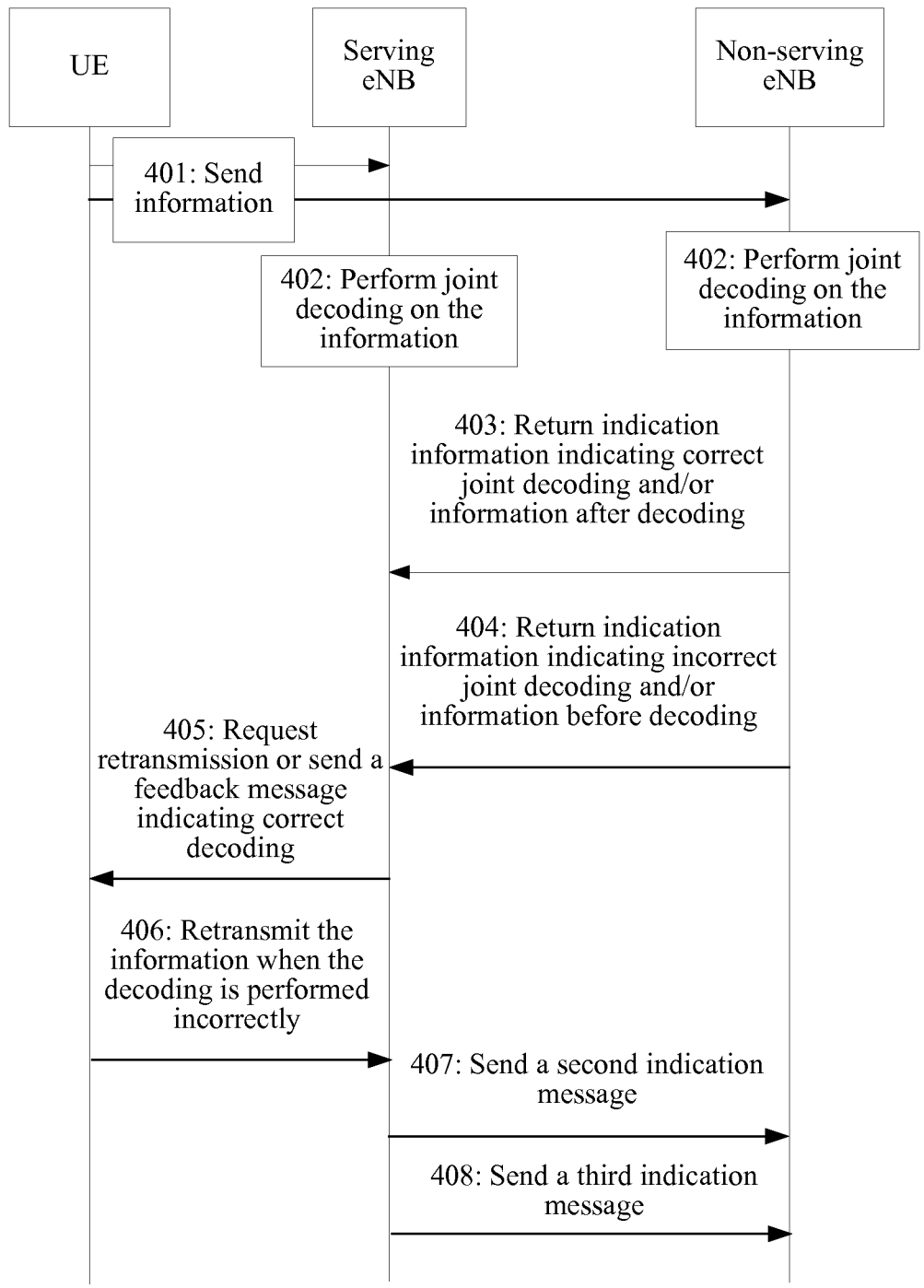
FIG. 5 is a flowchart of an information processing method according to a fourth method embodiment of the present invention.

An information processing method in this embodiment of the present invention may be applicable to a CoMP system. Multiple cells receive information sent by a UE concurrently, and the multiple cells are located in different eNodeBs. FIG. 5 is a flowchart of the method. As specific implementation of the method embodiment 2, the method includes:

Step 401: A UE sends information, and multiple cells jointly receive the information concurrently. The multiple cells may be located in different eNodeBs, for example, a serving eNodeB and a non-serving eNodeB.

Step 402: The serving eNodeB and non-serving eNodeB receive the information sent by the UE, and perform joint decoding respectively on the information that is sent by the UE and received in each eNodeB.

If the non-serving eNodeB performs the joint decoding correctly, step 403 is performed; and if the joint decoding is performed incorrectly, step 404 is performed.

Step 403: The non-serving eNodeB sends indication information indicating correct joint decoding and/or information after correct joint decoding to the serving eNodeB.

The non-serving eNodeB may also send an indication message indicating correct joint decoding and/or information (MAC PDU) after correct joint decoding to the serving eNodeB. It can be understood that the information after correct joint decoding and indication message indicating correct decoding may be carried in one message and sent to the serving eNodeB through an X2 interface; or may be carried in different messages and sent to the serving eNodeB. For example, first the indication information indicating correct joint decoding is sent to the serving eNodeB, the serving eNodeB may send a feedback message to the UE according to the indication information, and then the non-serving eNodeB forwards decoded information to the serving eNodeB.

Step 404: The non-serving eNodeB sends indication information indicating incorrect joint decoding, and/or information before the joint decoding to the serving eNodeB.

A specific method is referred to the description in step 305.

Step 405: The serving eNodeB returns a feedback message to the UE according to result information about the joint decoding, where the joint decoding is performed by the non-serving eNodeB on the information sent by the UE, and/or result information about the joint decoding performed by the serving eNodeB.

When the joint decoding is correctly performed by the serving eNodeB, and/or the serving eNodeB receives an indication message indicating correct joint decoding performed by any non-serving eNodeB or information after correct joint decoding, the serving eNodeB sends a feedback message indicating correct joint decoding to the UE.

When the serving eNodeB receives indication information indicating incorrect joint decoding, where the indication information is sent by all non-serving eNodeBs, and the serving eNodeB incorrectly performs joint decoding on the information sent by the UE, the serving eNodeB sends a feedback message (NACK) indicating incorrect joint decoding to the UE, and requests the UE to retransmit the information.

Alternatively, when the serving eNodeB receives information before joint decoding, where the information is sent by all the non-serving eNodeBs, and the serving eNodeB incorrectly performs joint decoding on the information sent by the UE, the serving eNodeB performs cross-eNodeB joint decoding on the received information before joint decoding, where the received information is sent by the non-serving eNodeB. If a result of the cross-eNodeB joint decoding is incorrect, a feedback message (NACK) indicating incorrect joint decoding is sent to the UE to request the UE to retransmit the information.

When the serving eNodeB determines that returning the feedback message to the UE is delayed, the serving eNodeB may send a message to the UE, indicating the time for receiving the feedback message by the UE.

If the result of the joint decoding performed by the serving eNodeB is that the joint decoding is performed incorrectly (NACK), the serving eNodeB may forward an incorrectly decoded data packet to the non-serving eNodeB that retransmits data, and the non-serving eNodeB that retransmits data performs retransmission combination and joint decoding. It should be noted that after the non-serving eNodeB performs retransmission combination and joint decoding, a result is sent to the serving eNodeB. A detailed method may be referred to the executing method for newly transmitting information (information received for the first time) in this embodiment.

Step 406: The UE retransmits the information when receiving the feedback message indicating incorrect joint decoding.

Optionally, the serving eNodeB may perform step 407 or step 408.

Step 407: The serving eNodeB sends a second indication message to the non-serving eNodeB, indicating information about data (according to a decoding condition, data after correct decoding or data before decoding is forwarded) discarded by the non-serving eNodeB, and/or forwarded to the serving eNodeB. The non-serving eNodeB receives the second indication message and discards or forwards the data.

It can be understood that the second indication message sent by the serving eNodeB to the non-serving eNodeB may also include an identifier of the UE (UE ID), an identifier of a coordinating cell (serving cell ID), and resource information (frequency information and time information (SFN+subframe)).

Step 408: The serving eNodeB sends a third indication message to the non-serving eNodeB through an interface (X2) between the eNodeBs, indicating the eNodeB that forwards the data information, for example, the eNodeB that forwards information after correct decoding. For example, when all the non-serving eNodeB perform joint decoding incorrectly, the non-serving eNodeB needs to be instructed to forward the data information before decoding. The data information required to be discarded in which eNodeB is not indicated. The non-serving eNodeB may start a timer simultaneously when sending the third indication message indicating the joint decoding result. If no indication message indicating information after correct decoding when the timer (for example, HARQ RTT+eNodeB process time) expires, it is considered that the serving eNodeB does not need the information after correct decoding, and the information about the correct decoding is discarded.

It should be noted that, during information communication in this embodiment, an information sending party may assign a priority to information to be sent, and sends the information according to the priority. A detailed method for assigning the priority may be referred to the description in step 102 in the method embodiment 1, which is not described here again.

In this embodiment, the serving eNodeB and the non-serving eNodeB receive the information sent by the UE, and perform separately joint decoding respectively on the information sent by the UE; the non-serving eNodeB directly sends the result information about the joint decoding to the serving eNodeB, and the serving eNodeB returns a feedback message to the UE. This embodiment is detailed implementation of the method embodiment 2. Because the size of the result information about the joint decoding is smaller than that of the information sent by the UE, transmission time between the eNodeBs may be shortened, and therefore, a process of information transmission between the UE and the eNodeB is shortened.

Method Embodiment 5

Figure 6:
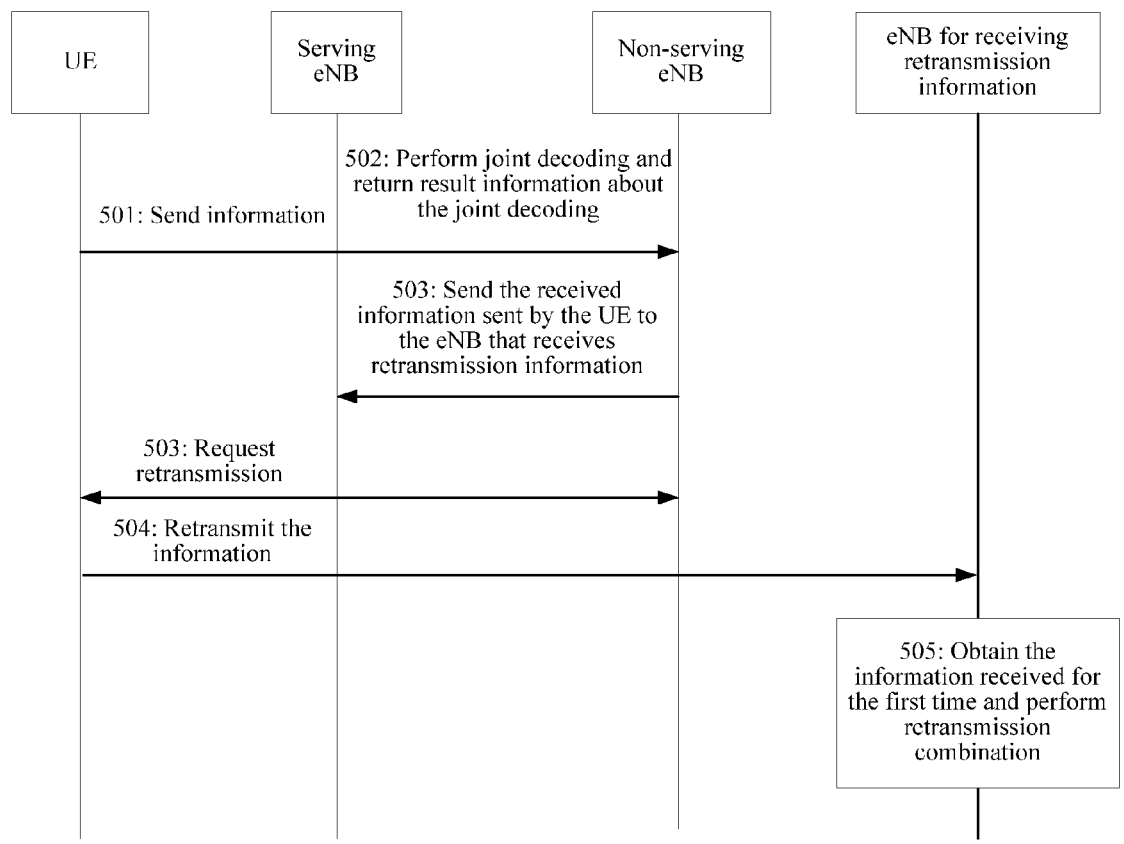
FIG. 6 is a flowchart of an information processing method according to a fifth method embodiment of the present invention.

An information processing method in this embodiment of the present invention may be applicable to a CoMP system. Multiple cells receive information sent by a UE concurrently, and the multiple cells are located in different eNodeBs. In a dynamic cell selection process in a CoMP system, the case that at certain time, only one cell receives the information sent by the UE at uplink may be selected, and an eNodeB where the receiving cell is located may be a serving eNodeB, or may be a non-serving eNodeB. FIG. 6 is a flowchart of the method according to this method embodiment. The method includes:

Step 501: A UE sends information, and at this time, only an eNodeB where a receiving cell is located receives the information sent by the UE.

If the eNodeB where the receiving cell is located is a non-serving eNodeB:

Step 502: The non-serving eNodeB receives the information sent by the UE, joint decoding is performed on the information that is sent by the UE and received by the non-serving eNodeB, and result information about the joint decoding is sent to a serving eNodeB. A specific process may be referred to the description in steps 402 to 404, which is not described here again.

Step 503: If the result information received by the serving eNodeB indicates that the non-serving eNodeB incorrectly performs joint decoding, a feedback message indicating incorrect joint decoding is returned to the UE to request the UE to retransmit the information.

When the serving eNodeB receives indication information about incorrect joint decoding and/or information before joint decoding, it indicates that the non-serving eNodeB performs joint decoding incorrectly.

Furthermore, the serving eNodeB may instruct the non-serving eNodeB that receives the information sent by the UE for the first time to forward the received information sent by the UE to an eNodeB that receives retransmission information of the UE, and the eNodeB that receives retransmission information may be a serving eNodeB or may be a non-serving eNodeB.

Step 504: The UE retransmits the information when receiving the feedback message indicating incorrect joint decoding.

Step 505: After the eNodeB that receives retransmission information receives the retransmission information from the UE, the eNodeB performs retransmission combination of the retransmission information and the information received for the first time.

It can be understood that if the eNodeB that receives retransmission information is not the non-serving eNodeB that receives the information for the first time, the information received for the first time needs to be obtained from the non-serving eNodeB that receives the information for the first time, and then the retransmission combination is performed.

It should be noted that the eNodeB that receives retransmission information performs retransmission combination and decoding, and then sends a result to the serving eNodeB. A detailed method may be referred to the executing method for newly transmitting information (information received for the first time) in this embodiment.

It should be noted that, during information communication in this embodiment, an information sending party may assign a priority to information to be sent, and sends the information according to the priority. A detailed method for assigning the priority may be referred to the description in step 102 in the method embodiment 1, which is not described here again.

In this embodiment, the non-serving eNodeB sends the result information of the joint decoding to the serving eNodeB, and the serving eNodeB returns a feedback message to the UE according to the result information about the joint decoding performed by the non-serving eNodeB. Because the size of the result information about the joint decoding is smaller than that of the information sent by the UE, transmission time between the eNodeBs may be shortened, and therefore, a process of information transmission between the UE and the eNodeB may be shortened.

Method Embodiment 6

Figure 7:
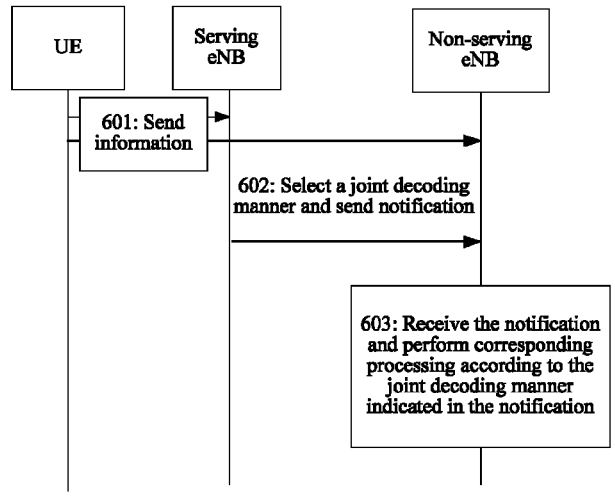
FIG. 7 is a flowchart of an information processing method according to a sixth method embodiment of the present invention.

An information processing method in this embodiment is a specific implementing method of the method embodiment 1. FIG. 7 is a flowchart of the method. The method includes:

Step 601: A UE sends information.

Step 602: A serving eNodeB selects a joint decoding manner, and notifies a non-serving eNodeB of the joint decoding manner through dynamic or semi-static signaling.

The execution of this step is not dependent on the execution of step 601, that is, there is no absolute sequential relation and conditional relation between the two steps.

The joint decoding manner includes, but are not limited to the following manners: The non-serving eNodeB forwards the received information sent by the UE (that is, information before decoding) to the serving eNodeB for joint decoding; or the non-serving eNodeB returns a result of decoding performed by the non-serving eNodeB on locally received information to the serving eNodeB; or when receiving a request sent by the serving eNodeB, the non-serving eNodeB returns the result of decoding performed by the non-serving eNodeB on the locally received information to the serving eNodeB. In this circumstance, the serving eNodeB sending the notification to the non-serving eNodeB further includes: instructing the non-serving eNodeB to start decoding when receiving the information sent by the UE, or instructing the non-serving eNodeB to start performing decoding on the information sent by the UE only when receiving the request sent by the serving eNodeB.

Step 603: The non-serving eNodeB receives the notification, and according to the joint decoding manner indicated in the notification, performs corresponding processing on the information sent by the UE.

If the notification indicates that the non-serving eNodeB returns the result of decoding performed by the non-serving eNodeB on the locally received information to the serving eNodeB, the execution is performed according to the steps in the method embodiment 4; if the notification indicates that when receiving the request sent by the serving eNodeB, the non-serving eNodeB returns the result of decoding performed by the non-serving eNodeB on the locally received information to the serving eNodeB, the execution is performed according to the steps in the method embodiment 3.

It should be noted that, during information communication in this embodiment, an information sending party may assign a priority to information to be sent, and sends the information according to the priority. A detailed method for assigning the priority may be referred to the description in step 102 in the method embodiment 1, which is not described here again.

In this embodiment, the joint decoding manner may be selected according to practical needs, so that when multiple cells that receive information sent by the UE are located in different eNodeBs, the joint decoding can be diversified.

Method Embodiment 7

Figure 8:
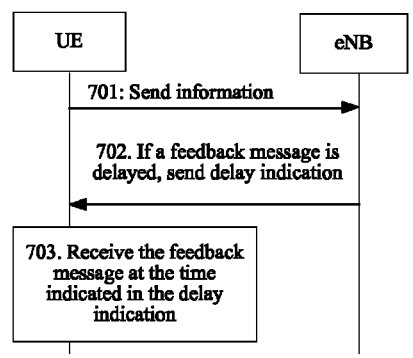
FIG. 8 is a flowchart of an information processing method according to a seventh method embodiment of the present invention.

An information processing method in this embodiment may be applicable to a communication system where information sent from a UE is received by different eNodeBs, and may also be applicable to a communication system where information sent from a UE are received by the same eNodeB. FIG. 8 is a flowchart of the method. The method includes:

Step 701: A UE sends information to an eNodeB.

Step 702: After receiving the information sent by the UE, the eNodeB determines whether returning a feedback message for the information sent by the UE to the UE is delayed. If delayed, delay indication is sent to the UE to instruct the UE to receive delay information about the feedback message for the information.

The delay information includes: the time of the UE receiving the feedback message, that is, in which TTI of an HARQ RTT, the UE receives the feedback information from the eNodeB, and may further include: information indicating whether the feedback message returned by the eNodeB is delayed; and/or information indicating a resource used by the UE to receive the feedback message in an HARQ process. If the feedback message returned by the eNodeB is delayed, the delay indication information may include the receiving time and resource information of the UE.

There is an implicit mapping relationship between a resource used by the UE to transmit data at uplink and a resource used by the UE to receive feedback data at downlink. If the UE transmits data at an $N^{th}$ subframe, a feedback message can be received at a $(N+4)^{th}$ subframe. However, the serving eNodeB may not obtain all joint decoding results of all jointly receiving cells (including the non-serving eNodeB), and may not send a feedback message (ACK/NACK) in a specified HARQ process, in the cases that the delay of an interface (X2) between the eNodeBs is limited, or the delay of a data block at an air interface is spread, or the eNodeB decoding is delayed. Consequently, the feedback message returned by the serving eNodeB to the UE is delayed. At this time, the serving eNodeB may send the delay indication of the feedback message in the HARQ process to the UE, indicating that the feedback message returned by the eNodeB is delayed, and may instruct the UE to receive the delay information about the feedback message for the information. The delay information may include: In which TTI in the HARQ process, the UE receives the feedback message, and/or the related information about the resource used for sending the feedback message.

For example, the indication may indicate that in which TTI after the present TTI, the feedback message is sent, and/or indicate a related condition of the resource used for sending the feedback message. The delay indication may be sent to the UE through RRC signaling, MAC Control PDU, and a physical layer control channel.

Definitely, the information indicating that in which TTI in the HARQ RTT, the UE receives the feedback message, and the information indicating the related condition of the resource used for sending the feedback message may be transmitted to the UE through different transmission manners in different time.

In the HARQ process, the information about the resource used for sending the feedback message may indicate the resource used in the HARQ process by using separate information, or by using starting positions of used resources in all 8 HARQ processes.

Step 703: The UE receives the delay indication, and receives the feedback message by using the resource indicated by the delay indication in the time indicated by the delay indication.

If the delay indication includes information indicating that the feedback message returned by the eNodeB is not delay, the UE receives the feedback message according to the implicit mapping relationship between the resource for receiving and the resource for transmitting in the HARQ process on the present channel.

If the delay indication includes delay information indicating the time of the UE receiving the feedback message, but does not include information about the resource used by the UE to receive the feedback message in the HARQ process, according to the implicit mapping relationship between the resource for receiving and the resource for transmitting in the HARQ process on the present channel, the UE receives the feedback message by using the corresponding resource in the time indicated by the delay indication.

If the delay indication includes the delay information indicating the time of the UE receiving the feedback message, and the information about the resource used by the UE to receive the feedback message in the HARQ process, the UE receives the feedback message by using the corresponding indicated resource in the time indicated by the delay indication.

Definitely, delay time information of the delay indication may be notified of the UE through a semi-static manner, indicating that from the time (TTI) of sending a feedback result (ACK/NACK) in an HARQ RTT in the present serving eNodeB to the next signaling for notifying the change of feedback time, the UE receives the feedback result from the serving eNodeB at the time of sending the feedback result. At this time, the eNodeB only needs to dynamically instruct the UE to receive the information about the resource for sending the feedback message in the HARQ process.

It should be noted that, during information communication in this embodiment, an information sending party may assign a priority to information to be sent, and sends the information according to the priority. A detailed method for assigning the priority may be referred to the description in step 102 in the method embodiment 1, which is not described here again.

In this embodiment, the UE sends information to the eNodeB, and when the eNodeB returning a feedback message is delayed, delay indication is used to indicate a status of the UE receiving the feedback message. Therefore, when the eNodeB returning the feedback message is delayed, the UE may also receive the feedback message and know a status of processing performed by the eNodeB on the information sent by the UE.

Method Embodiment 8

Figure 9:
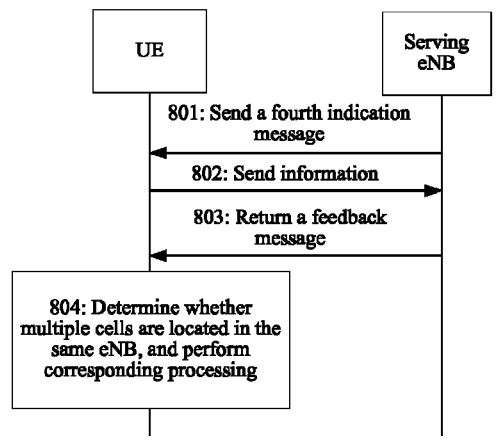
FIG. 9 is a flowchart of an information processing method according to an eighth method embodiment of the present invention.

An information processing method in this embodiment may be applicable to a communication system where information sent from a UE are received by different eNodeBs, and may also be applicable to a communication system where information sent from a UE are received by the same eNodeB. FIG. 9 is a signaling flowchart of the method. The method includes:

Step 801: A serving eNodeB sends a fourth indication message to a UE, the fourth indication message indicates that whether multiple cells that receive information sent by the UE are located in the same eNodeB.

It can be understood that, the "fourth" in the fourth indication message here does not represent a sequence of the message, but is only used for differentiating this message from the first, second, and third indication message which are described in the preceding description. The serving eNodeB may send the fourth indication message at any time. The fourth indication message may be transmitted to the UE through RRC signaling, MAC Control PDU, or a physical layer control channel. This step is performed without depending on the following steps.

Step 802: The UE sends information to the serving eNodeB.

Step 803: The serving eNodeB sends a feedback message in response to the information to the UE.

If the multiple cells that receive the information sent by the UE are not located in the same eNodeB, specific steps for the serving eNodeB returning the feedback message may be referred to the description in the preceding embodiment. Due to delay of an X2, if a delay is produced when the serving eNodeB returns the feedback message to the UE, the serving eNodeB may first feed back result information about correct or incorrect joint decoding performed by the serving eNodeB to the UE through the feedback message, or perform no feedback but to return the feedback message to the UE when receiving result information about joint decoding, where the result information about joint decoding is returned by the non-serving eNodeB. If the multiple cells that receive the information sent by the UE are located in the same eNodeB, which is the content of the prior art, and is not described here again.

Step 804: The UE determines, according to the fourth indication message described in step 801, whether the multiple cells that receive the information sent by the UE are located in the same eNodeB, and performs corresponding processing.

If the fourth indication message indicates that the multiple cells that receive the information sent by the UE are not located in the same eNodeB, the UE retransmits the information when determining that the serving eNodeB incorrectly performs joint decoding on the information at least twice. Specifically, if the UE receives the feedback message indicating incorrect joint decoding performed by the serving eNodeB on the information, and a feedback message indicating incorrect cross-eNodeB joint decoding performed by the serving eNodeB on the information sent by the non-serving eNodeB, the UE retransmits the information; or if the UE receives no feedback message sent by the serving eNodeB within specified time, and receives the feedback message indicating incorrect cross-eNodeB joint decoding performed by the serving eNodeB on the information sent by the non-serving eNodeB, the UE retransmits the information. That is, the UE may not receive the feedback message at the first feeding back time, but at the second feeding back time, receives the feedback message indicating incorrect cross-eNodeB joint decoding performed by the serving eNodeB on the information sent by the non-serving eNodeB, and then the UE retransmits the information.

For example, if the UE determines that the multiple cells that receive the information sent by the UE are not located in the same eNodeB, in the case that delay of the X2 is limited, the UE does not perform processing when receiving a first feedback message indicating incorrect joint decoding, that is, a result of the joint decoding performed by the serving eNodeB on locally received information, but retransmits the information when receiving a next feedback message indicating incorrect joint decoding on the information.

If the fourth indication message indicates that the multiple cells that receive the information are located in the same eNodeB and the feedback message received in the current HARQ RTT indicates a result of joint decoding performed on all received data, the UE retransmits the information when receiving the feedback message indicating incorrect joint decoding performed by the serving eNodeB on the information. Specifically, the information is retransmitted when the first feedback message indicating incorrect joint decoding on the information is received.

It should be noted that, during information communication in this embodiment, an information sending party may assign a priority to information to be sent, and sends the information according to the priority. A detailed method for assigning the priority may be referred to the description in step 102 in the method embodiment 1, which is not described here again.

In this embodiment, the UE sends information, and performs corresponding processing on a received feedback message according to the fourth indication message indicating whether the multiple cells receive the information are located in the same eNodeB. In this way, the UE retransmits the information only when knowing that the eNodeBs incorrectly perform joint decoding on the information at an X2 interface between the eNodeBs, which reduces the number of information retransmission times.

Equipment Embodiment 1

Figure 10:
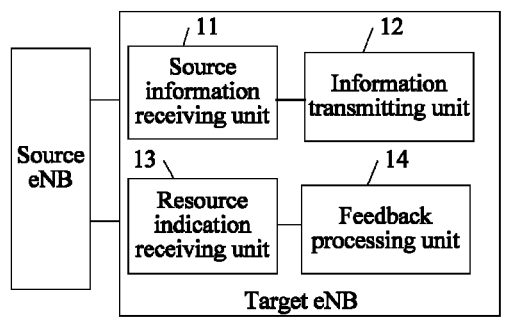
FIG. 10 is a schematic diagram showing a logical structure of an eNodeB according to a first equipment embodiment of the present invention.

An eNodeB in this embodiment is an eNodeB where a cell after a UE is handed over is located, that is, a target eNodeB. FIG. 10 is a schematic diagram showing a logical structure of the eNodeB. The eNodeB includes:

a source information receiving unit 11, configured to receive information sent by a an eNodeB where a source serving cell of a UE is located, where the information includes: processing status information and data information which are obtained after the eNodeB where the source serving cell is located processes data transmitted by the UE, or data information in at least two user plane protocol stacks of the eNodeB where the source serving cell is located, or data information in user plane protocol stacks except PDCP in the eNodeB where the source serving cell is located; and an information transmitting unit 12, configured to transmit data with the UE according to the information received by the source information receiving unit 11.

In other eNodeB embodiments, the eNodeB further includes:

a resource indication receiving unit 13, configured to receive a first indication message sent by the eNodeB where the source serving cell is located, where the first indication message includes information about a resource used by an eNodeB where a target serving cell of the UE is located to return a feedback message to the UE or receive the feedback message; and a feedback processing unit 14, configured to receive or send a feedback message in a corresponding channel resource according to the resource information indicated in the first indication message received by the resource indication receiving unit 13.

In this embodiment, the information processing module 12 of the eNodeB transmits data with the UE according to the information received by the source information receiving unit 11. The information received by the source information receiving unit includes the processing status information and data information which are obtained by processing the data transmitted by the UE, or data information in at least two user plane protocol stacks of a source eNodeB, or data information in user plane protocol stacks except PDCP in the source eNodeB. In this way, compared with the prior art where only original data received by the eNodeB at the highest layer, that is a PDCP layer, is performed processing, with the eNodeB in this embodiment of the present invention, during the handover, data loss of the processing status information and data information which are obtained after each user plane protocol stack of the source eNodeB processes the data transmitted by the UE is reduced.

Equipment Embodiment 2

Figure 11:
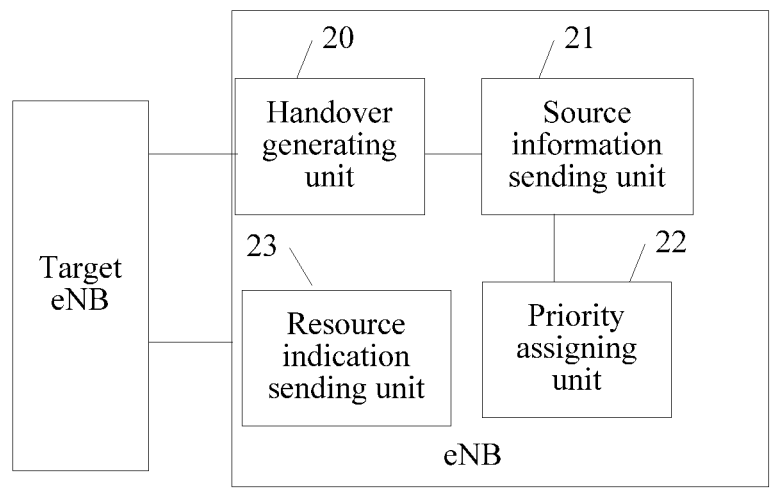
FIG. 11 is a schematic diagram showing a logical structure of an eNodeB according to a second equipment embodiment of the present invention.

An eNodeB in this embodiment is an eNodeB where a cell before a UE is handed over is located, that is, a source eNodeB. FIG. 11 is a schematic diagram showing a logical structure of the eNodeB. The eNodeB includes:

a handover generating unit 20, configured to receive a handover request acknowledge message and send a target handover command; and a source information sending unit 21, configured to send information to an eNodeB where a target serving cell of the UE is located, where the information includes: processing status information and data information which are obtained after an eNodeB where a source serving cell is located processes data transmitted by the UE, or data information in at least two user plane protocol stacks of the eNodeB where the source serving cell is located, or data information in user plane protocol stacks except PDCP in the eNodeB where the source serving cell is located; and configured to instruct the eNodeB where the target serving cell is located to perform corresponding processing. The source information sending unit 21 needs to perform sending only after the handover generating unit 20 being operated.

In other eNodeB embodiments, the eNodeB further includes: a priority assigning unit 22, and a resource indication sending unit 23.

the priority assigning unit 22 is configured to assign a priority to the information sent by the information sending unit; and according to the priority assigned by the priority assigning unit 22, the source information sending unit 21 sends the information to the eNodeB where the target serving cell of the UE is located.

The resource indication sending unit 23 is configured to send an indication message to the eNodeB where the target serving cell is located, indicating information about a resource used by the eNodeB where the target serving cell is located to receive feedback information from the UE or send feedback information to the UE.

In this embodiments, the source information sending unit 21 of the eNodeB sends to a target eNodeB: the processing status information and data information which are obtained by processing the data transmitted by the UE, or data information in at least two user plane protocol stacks of the source eNodeB, or data information in user plane protocol stacks except PDCP in the source eNodeB, so that the target eNodeB may transmit data with the UE according to the information. In this way, compared with the prior art where the source eNodeB sends only original data received at the highest layer, that is a PDCP layer, to the target eNodeB, with the eNodeB in this embodiment of the present invention, during the handover, data loss of the processing status information and data information which are obtained after each user plane protocol stack of the source eNodeB processes the data transmitted by the UE is reduced.

Equipment Embodiment 3

Figure 12:
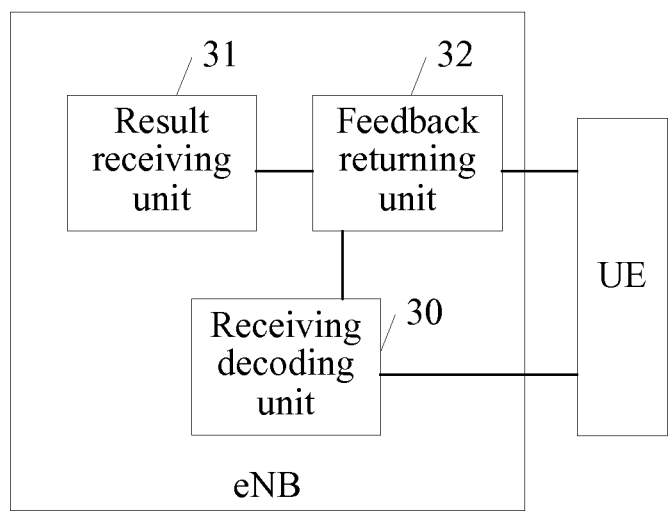
FIG. 12 is a schematic diagram showing a logical structure of an eNodeB according to a third equipment embodiment of the present invention.

An eNodeB in this embodiment is a serving eNodeB of a UE. FIG. 12 is a schematic diagram showing a logical structure of the eNodeB. The eNodeB includes:

a receiving decoding unit 30, configured to receive information sent by a UE and perform joint decoding on the information sent by the UE;

a result receiving unit 31, configured to receive result information about the joint decoding performed on the information sent by the UE, where the information about the joint decoding is sent by at least one non-serving eNodeB of the UE;

a feedback returning unit 32, configured to return a feedback message to the UE according to the result information about the joint decoding performed by the non-serving eNodeB on the information sent by the UE, where the result information is received by the result receiving unit 31, and/or result information about the joint decoding performed by the receiving decoding unit 30 on the information sent by the UE.

Equipment Embodiment 4

Figure 13:
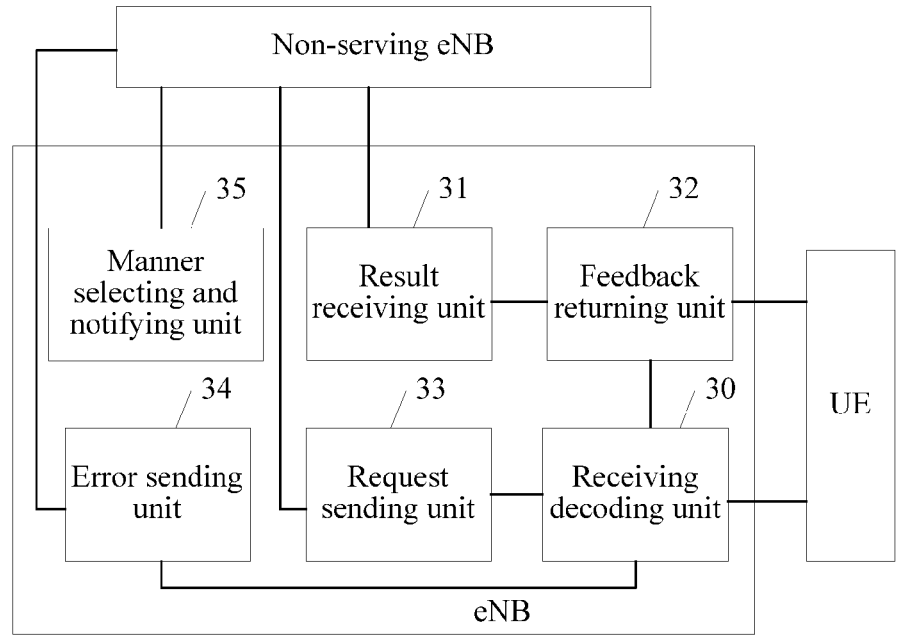
FIG. 13 is a schematic diagram showing a logical structure of an eNodeB according to a fourth equipment embodiment of the present invention.

Compared with the eNodeB described in the equipment embodiment 3, an eNodeB in this embodiment is added a request sending unit 33 and an error sending unit 34. FIG. 13 is a schematic diagram showing a logical structure of the eNodeB.

The request sending unit 33 is configured to, when a receiving decoding unit 30 incorrectly performs joint decoding on information sent by a UE, send a request to at least one non-serving eNodeB of the UE, and request the non-serving eNodeB to return result information about the joint decoding on the information sent by the UE.

The error sending unit 34 is configured to send an incorrectly decoded data packet to at least one non-serving eNodeB servicing the UE for retransmission combination and joint decoding when determining that the receiving decoding unit 30 incorrectly performs joint decoding on the information sent by the UE.

Optionally, the eNodeB may further include: a manner selecting and notifying unit 35, configured to select a joint decoding manner and notify the non-serving eNodeB of the UE of the joint decoding manner.

The joint decoding manner includes: The non-serving eNodeB forwards the received information sent by the UE to a serving eNodeB for joint decoding; or the non-serving eNodeB returns the result information about the joint decoding performed by the non-serving eNodeB on the information sent by the UE to the serving eNodeB; or the non-serving eNodeB returns the result information about the joint decoding performed by the non-serving eNodeB on the information sent by the UE to the serving eNodeB when receiving a request sent by the serving eNodeB.

Equipment Embodiment 5

Figure 14:
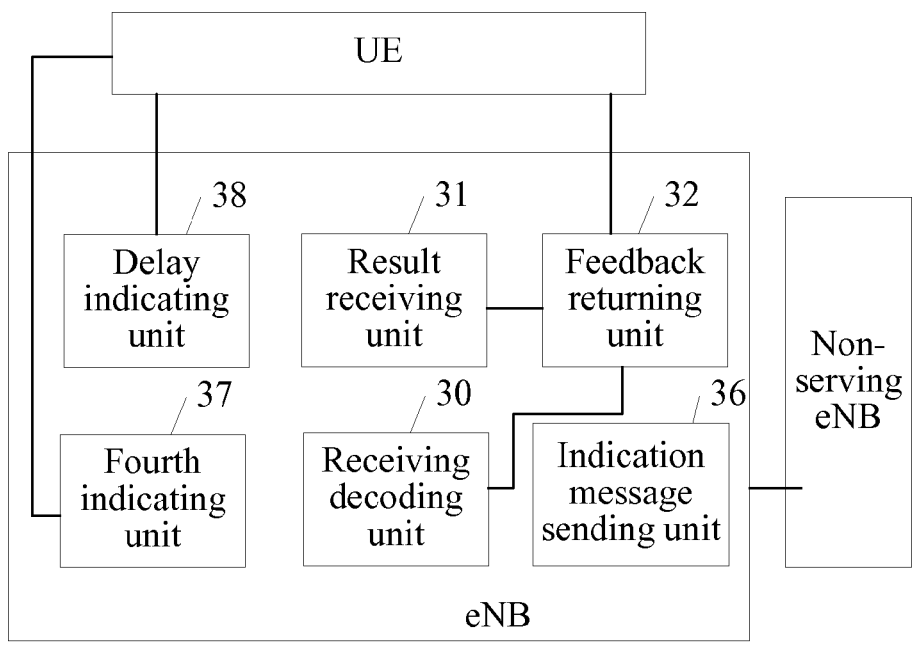
FIG. 14 is a schematic diagram showing a logical structure of an eNodeB according to a fifth equipment embodiment of the present invention.

Compared with the eNodeB described in the equipment embodiment 3, an eNodeB in this embodiment is added an indication message sending unit 36, a fourth indicating unit 37, and a delay indication unit 38. FIG. 14 is a schematic diagram showing a logical structure of the eNodeB.

The indication message sending unit 36 is configured to send a second indication message, where the second indication message includes indicating information about data discarded by a non-serving eNodeB, and/or forwarded to the serving eNodeB; or send a third indication message, where the third indication message includes indicating information about the non-serving eNodeB that discards and/or forwards the data information.

The fourth indicating unit 37 is configured to send a fourth indication message to the UE, where the fourth indication message is used to indicate whether multiple cells that receive information sent by a UE currently are located in the same eNodeB.

The delay indication unit 38, configured to send delay indication to the UE when returning a feedback message to the UE is delayed, where the delay indication is used to indicate delay information about the UE receiving the feedback message, and the delay information includes delay time for the UE receiving the feedback message.

Equipment Embodiment 6

Figure 15:
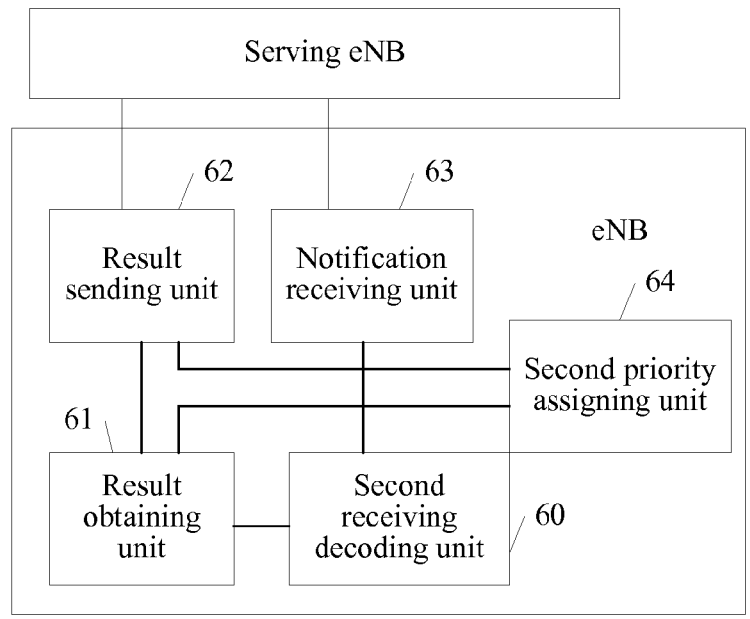
FIG. 15 is a schematic diagram showing a logical structure of an eNodeB according to a sixth equipment embodiment of the present invention.

An eNodeB in this embodiment is a non-serving eNodeB of a UE. FIG. 15 is a schematic diagram showing a logical structure of the eNodeB. The eNodeB includes:

a second receiving decoding unit 60, configured to receive information sent by a UE and perform joint decoding on the information sent by the UE;

a result obtaining unit 61, configured to obtain result information about the joint decoding performed by the second receiving decoding unit 60; and a result sending unit 62, configured to send the result information about the joint decoding to a serving eNodeB of the UE, where the result information is obtained by the result obtaining unit 61.

Optionally, in this embodiment, the eNodeB further includes: a notification receiving unit 63 and a second priority assigning unit 64. The notification receiving unit 63 is configured to receive a notification message sent by the serving eNodeB of the UE, where the notification message indicates a joint decoding manner. The second receiving decoding unit 60 is configured to perform joint decoding according to the joint decoding manner received by the notification receiving unit 63. The second priority assigning unit 64 is configured to assign a priority to the result information about the joint decoding, where the result information is obtained by the result obtaining unit 61. The result sending unit 62 is configured to send the result information about the joint decoding according to the priority assigned by the second priority assigning unit.

Equipment Embodiment 7

Figure 16:
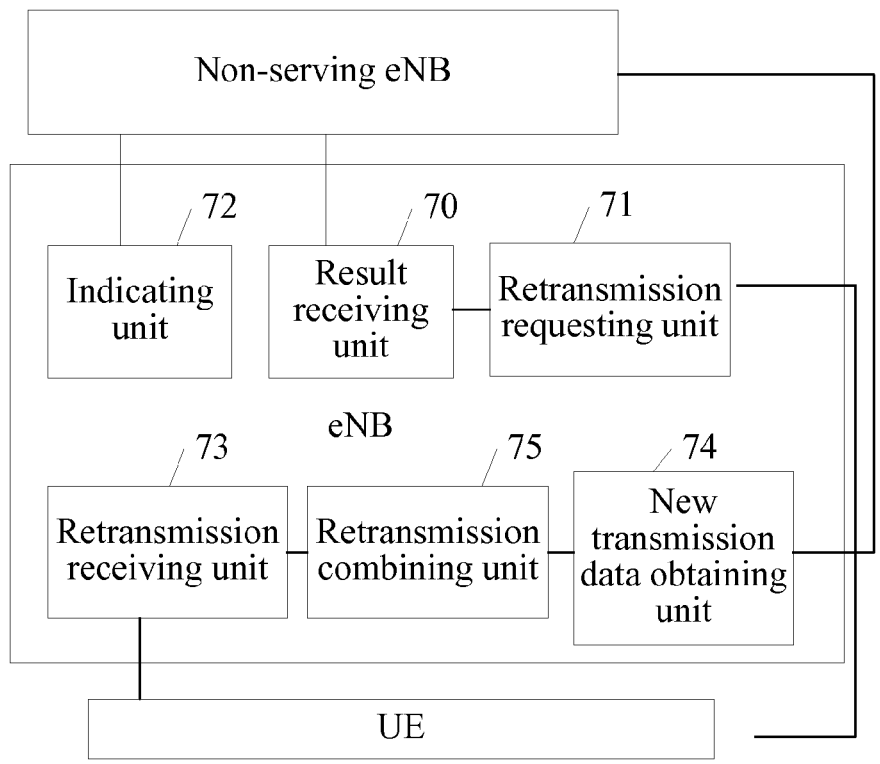
FIG. 16 is a schematic diagram showing a logical structure of an eNodeB according to a seventh equipment embodiment of the present invention.

FIG. 16 is a schematic diagram showing a logical structure of an eNodeB. The eNodeB includes:

a result receiving unit 70, configured to receive result information about joint decoding, where the result information about the joint decoding is sent by a non-serving eNodeB of a UE, and the joint decoding is performed on information sent by the UE; and a retransmission requesting unit 71, configured to return a feedback message indicating incorrect joint decoding and request the UE to retransmit the information, when the result information about the joint decoding indicates that the non-serving eNodeB incorrectly performs joint decoding on the information sent by the UE, where the result information is received by the result receiving unit 70.

Optionally, the eNodeB further includes: an instructing unit 72, configured to instruct the non-serving eNodeB to forward the received information sent by the UE to an eNodeB that receives retransmission information.

Furthermore, the eNodeB may further include: a retransmission receiving unit 73, a new transmission data obtaining unit 74, and a retransmission combining unit 75. the retransmission receiving unit 73 is configured to receive information retransmitted by the UE; the new transmission data obtaining unit 74 is configured to obtain the information from the non-serving eNodeB that receives the information sent by the UE for the first time; and the retransmission combining unit 75 is configured to perform retransmission combination on both the retransmitted information received by the retransmission receiving unit 73 and the information that is received for the first time and obtained by the new transmission data obtaining unit 74.

Equipment Embodiment 8

Figure 17:
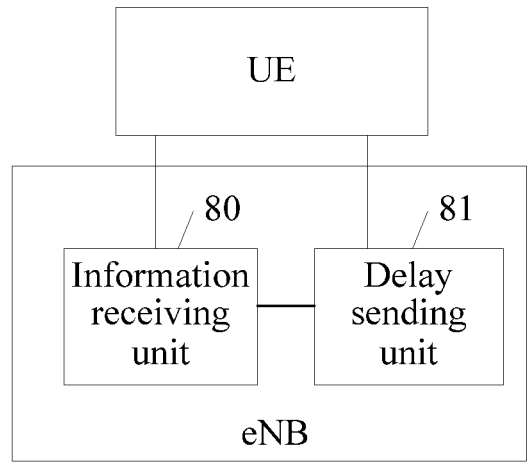
FIG. 17 is a schematic diagram showing a logical structure of an eNodeB according to an eighth equipment embodiment of the present invention.

FIG. 17 is a schematic diagram showing a logical structure of an eNodeB. The eNodeB includes:

an information receiving unit 80, configured to receive information sent by a UE;

a delay sending unit 81, configured to send delay indication to the UE when it is determined that returning a feedback message in response to the information received by the information receiving unit 80 to the UE is delayed, where the delay indication instructs the UE to receive delay information about the feedback message.

In this embodiment, the delay sending unit 81 of the eNodeB uses the delay indication to indicate a status of the UE receiving the feedback message when it is determined that the feedback message in response to the information received by the information receiving unit 80 is delayed. In this way, when the eNodeB returning a feedback message is delayed, the UE may also receive the feedback message, and know a status of processing performed by the eNodeB on the information sent by the UE.

Equipment Embodiment 9

Figure 18:
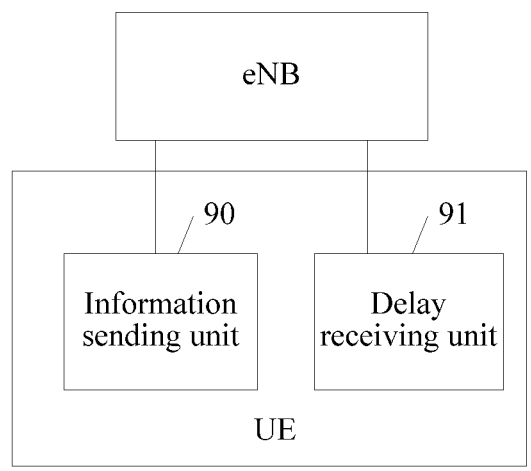
FIG. 18 is a schematic diagram showing a logical structure of a UE according to a ninth equipment embodiment of the present invention.

FIG. 18 is a schematic diagram showing a logical structure of a UE. The UE includes:

an information sending unit 90, configured to send information to an eNodeB; and a delay receiving unit 91, configured to, when receiving delay indication returned by the eNodeB, receive a feedback message returned by the eNodeB according to indication of the delay indication, where the delay indication includes delay time for the UE receiving the feedback message.

In this embodiment, when receiving the delay indication, the delay receiving unit 91 of the UE receives the feedback message according to the indication. In this way, when the eNodeB returning a feedback message is delayed, the UE may also receive the feedback message, and know a status of processing performed by the eNodeB on the information sent by the UE.

Equipment Embodiment 10

Figure 19:
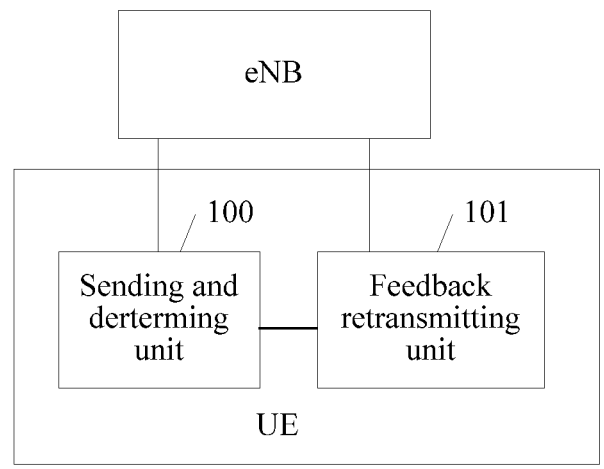
FIG. 19 is a schematic diagram showing a logical structure of a UE according to a tenth equipment embodiment of the present invention.

FIG. 19 is schematic diagram showing a logical structure of a UE. The UE includes:

a sending and determining unit 100, configured to send information and determine whether multiple cells that receive the information are located in the same eNodeB; and a feedback retransmitting unit 101, configured to retransmit the information when the sending and determining unit determines that the multiple cells that receive the information are not located in the same eNodeB, and a serving eNodeB incorrectly performs joint decoding on the information at least twice.

In this embodiment, when the sending and determining unit 101 of the UE determines that the multiple cells that receive the information sent by the UE are not located in the same eNodeB, the feedback retransmitting unit 101 retransmits the information only when receiving a feedback message indicating incorrect joint decoding at least twice. In this way, the UE retransmits the information only when knowing that the eNodeBs incorrectly perform joint decoding on the information at an X2 interface of the eNodeBs, which reduces the number of information retransmission times.

System Embodiment 1

Figure 20:
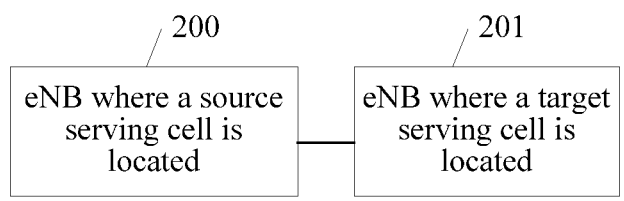
FIG. 20 is a schematic diagram showing a logical structure of an information processing system according to a first system embodiment of the present invention.

FIG. 20 is a schematic structural diagram of an information processing system. The system includes an eNodeB where a source serving cell is located 200, and an eNodeB where a target serving cell is located 201.

The eNodeB where the source serving cell is located 200 is configured to receive a handover request acknowledge message, and after sending a target handover command, send information to the eNodeB where the target serving cell of a UE is located 201, where the information includes: processing status information and data information which are obtained after the eNodeB where the source serving eNodeB is located 200 processes data transmitted by the UE, or data information in at least two user plane protocol stacks of the eNodeB where the source serving cell is located 200, or data information in user plane protocol stacks except PDCP in the eNodeB where the source serving cell is located 200.

The eNodeB where the target serving cell is located 201 is configured to receive the information sent by the eNodeB where the source serving cell of the UE is located 200, and transmit data with the UE according to the information sent by the eNodeB where the source serving cell of the UE is located 200.

In the information processing system in this embodiment, the source eNodeB 200 sends to the target eNodeB 201: the processing status information and data information which are obtained by processing the data transmitted by the UE, or the data information in at least two user plane protocol stacks of the source eNodeB, or the data information in user plane protocol stacks except PDCP in the source eNodeB; and the target eNodeB 201 transmits data with the UE according to the information. In this way, compared with the prior art where the source eNodeB sends only original data received at the highest layer, that is a PDCP layer, to the target eNodeB, with the eNodeB in this embodiment of the present invention, during the handover, data loss of the processing status information and data information which are obtained after each user plane protocol stack of the source eNodeB 200 processes the data transmitted by the UE is reduced.

System Embodiment 2

Figure 21:
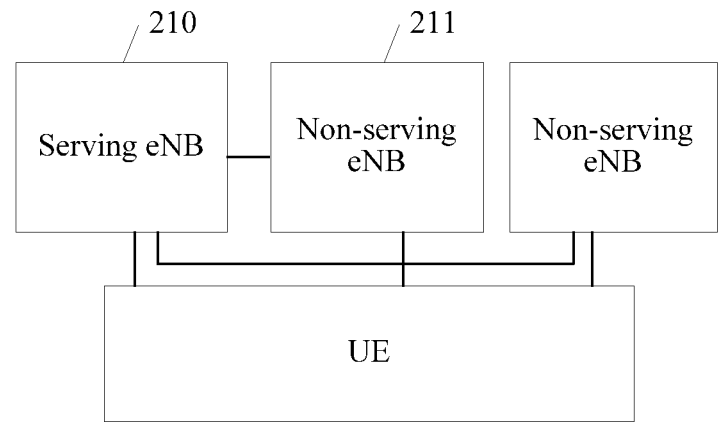
FIG. 21 is a schematic diagram showing a logical structure of an information processing system according to a second system embodiment of the present invention.

FIG. 21 is a schematic structural diagram of an information processing system. The system includes a serving eNodeB 210 and at least one non-serving eNodeB 211.

The non-serving eNodeB 211 is configured to receive information sent by a UE and perform joint decoding on the information sent by the UE; obtain result information about the joint decoding; and send the result information about the joint decoding to the serving eNodeB 210 of the UE.

The serving eNodeB 210 is configured to receive the information sent by the UE and perform joint decoding on the information sent by the UE; receive, from at least one non-serving eNodeB 211 of the UE, the result information about the joint decoding performed on the information sent by the UE; and return a feedback message to the UE according to the result information about the joint decoding performed by the non-serving eNodeB 211 on the information sent by the UE, and/or result information about the joint decoding performed by the serving eNodeB 210 on information sent by the UE.

In the information processing system in this embodiment, when multiple cells that receive the information sent by the UE are not located in the same eNodeB, after multiple eNodeBs receive the information sent by the UE, the serving eNodeB 210 returns a feedback message to the UE according to the result information about the joint decoding performed by the serving eNodeB 210, and/or the result information about the joint decoding, where the result information is returned by the non-serving eNodeB 211. Compared with the prior art where the serving eNodeB returns a feedback message to the UE after the serving eNodeB performs joint decoding, in this embodiment, the serving eNodeB 210 returns a feedback message to the UE according to the result information about the joint decoding, where the result information is returned by the non-serving eNodeB 211, only when the serving eNodeB 210 receives the result information about the joint decoding, where the result information is returned by the non-serving eNodeB 211. In this way, if most cells that receive information sent by the UE are located in the non-serving eNodeB, a success rate of the joint decoding performed by the non-serving eNodeB is higher than that of the joint decoding performed by the serving eNodeB, thus increasing a decoding rate.

System Embodiment 3

Figure 22:
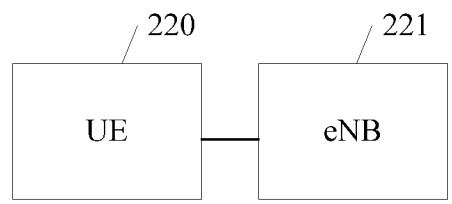
FIG. 22 is a schematic diagram showing a logical structure of an information processing system according to a third system embodiment of the present invention.

FIG. 22 is a schematic structural diagram of an information processing system. The system includes an eNodeB and a UE.

A UE 220 is configured to send information to an eNodeB 221.

The eNodeB 221 is configured to receive the information sent by the UE 220; send delay indication to the UE 220 when determining that returning to the UE 220 a feedback message in response to the information sent by the UE 220 is delayed; and instruct the UE 220 to receive delay information about the feedback message.

When the UE 220 receives the delay indication returned by the eNodeB 221, the feedback message returned by the eNodeB 221 is received according to indication of the delay indication, where the delay indication includes delay time for the UE 220 receiving the feedback message.

In the information processing system in this embodiment, the UE 200 sends information to the eNodeB 221, and uses delay indication to indicate a status of the UE 220 receiving the feedback message when a feedback message returned by the eNodeB 221 is delayed. In this way, when the eNodeB 221 returning a feedback message is delayed, the UE 221 may also receive the feedback message and know about a status of processing performed by the eNodeB on the information sent by the UE 220.

In embodiments of the present invention, the information processing method during UE handover is: A source eNodeB sends to a target eNodeB: processing status information and data information which are obtained after the source eNodeB processes data transmitted by a UE, or data information in at least two user plane protocol stacks of the source eNodeB, or data information in user plane protocol stacks except PDCP in the source eNodeB; and the target eNodeB transmits data with the UE according to the information. In this way, compared with the prior art where the source eNodeB sends only original data received at the highest layer, that is a PDCP layer, to the target eNodeB, with the method in this embodiment of the present invention, during the handover, reduces data loss of the processing status information and data information which are obtained after each user plane protocol stack of the source eNodeB processes the data transmitted by the UE is reduced.

It is understandable to those skilled in the art that all or a part of steps of each method in the preceding embodiments may be implemented by relevant hardware instructed by a program. The program may be stored in a computer readable storage medium. The storage medium may include an ROM, an RAM, a magnetic disk or a compact disk.

Although the information pressing method, system and equipment provided in the embodiments of the present invention have been described in detail, and the principle and implementation of the present invention are described through specific embodiments, the description of the preceding embodiments is only used to help understand the method and core idea of the present invention; meanwhile, those skilled in the art may make variations to the specific implementation and application scope of the invention according to the idea of the present invention. In sum, the content of the specification shall not be construed as a limitation to the present invention.

What is claimed is:

1. An information processing method, comprising:
    receiving, by a serving evolved NodeB (eNodeB), information sent by user equipment (UE), wherein the information is also sent to at least one non-serving eNodeB of the UE;
    receiving, by the serving eNodeB, from the at least one non-serving eNodeB of the UE, result information about decoding performed by the non-serving eNodeB on the information sent by the UE; and
    returning, by the serving eNodeB, a feedback message to the UE according to at least the result information about the decoding performed by the non-serving eNodeB on the information sent by the UE, wherein the feedback message indicates whether the information sent by the UE is decoded by the non-serving eNodeB correctly or incorrectly.

2. The method according to claim 1, further comprising:
    performing, by the serving eNodeB, decoding on the information received from the UE; and
    after performing the decoding by the serving eNodeB on the information received from the UE when decoding is incorrectly performed by the serving eNodeB on the information sent by the UE, sending a request to the at least one non-serving eNodeB of the UE, so as to request the non-serving eNodeB to return the result information about the decoding performed by the non-serving eNodeB on the information sent by the UE.

3. The method according to claim 1, wherein:
when the result information indicates that the decoding is performed correctly by the non-serving eNodeB, the result information comprises at least one of information generated after correct decoding and first indication information indicating that the decoding is performed by the non-serving eNodeB correctly; or, when the result information indicates that the decoding is performed incorrectly by all non-serving eNodeBs that receive the information sent by the UE, the result information comprises at least one of information before decoding and second indication information indicating that the decoding is performed by the non-serving eNodeBs incorrectly, wherein returning, by the serving eNodeB, the feedback message to the UE according to at least the result information comprises:
returning, by the serving eNodeB, a first feedback message indicating that the decoding is performed correctly to the UE, when receiving at least one of the information generated after correct decoding and the first indication information indicating that the decoding is performed correctly, where the first indication information is sent by any non-serving eNodeB.

4. The method according to claim 3, further comprising:
sending, by the serving eNodeB, a second indication message to the non-serving eNodeB, where the second indication message indicates to the non-servin eNodeB to discard information enerated after correct decodin or to discard the information sent by the UE, or indicates to the non-serving eNodeB to forward to the serving eNodeB the information generated after correct decoding or the information sent by the UE, wherein the information generated after correct decoding is generated after the information sent by the UE is decoded by the non-serving eNodeB correctly.

5. The method according to claim 1, further comprising:
selecting, by the serving eNodeB, a decoding manner, and notifying the non-serving eNodeB of the UE of the decoding manner;
wherein the decoding manner comprises: the non-serving eNodeB forwards the received information sent by the UE to the serving eNodeB for decoding;
or the non-serving eNodeB returns the result information about the decoding performed by the non-serving eNodeB on the information sent by the UE to the serving eNodeB; or when receiving a request sent by the serving eNodeB, the non-serving eNodeB returns the result information about the decoding performed by the non-serving eNodeB on the information sent by the UE to the serving eNodeB.

6. The method according to claim 1, further comprising:
sending a first indication message to the UE, where the first indication message is used to indicate whether multiple cells that currently receive the information sent by the UE are located in the same eNodeB.

7. The method according to claim 1, further comprising:
if returning the feedback message in response to the information sent by the UE to the UE is delayed, sending, by the serving eNodeB, delay indication to the UE, wherein the delay indication is used to instruct the UE to receive delay information about the feedback message, and the delay information comprises delay time for the UE to receive the feedback message.

8. The method according to claim 1, wherein when the result information indicates that the decoding is performed incorrectly by all non-serving eNodeBs that receive the information sent by the UE, the result information comprises second indication information indicating that the decoding is performed incorrectly by the non-serving eNodeBs,
wherein returning, by the serving eNodeB, the feedback message to the UE at least according to the result information comprises:
returning to the UE, by the serving eNodeB, a second feedback message indicating that the decoding is performed incorrectly when receiving the second indication information indicating that the decoding is performed incorrectly by all the non-serving eNodeBs that receive the information sent by the UE; and
requesting the UE to retransmit the information.

9. The method according to claim 8, further comprising:
after performing cross-eNodeB decoding by the serving eNodeB on the information before decoding, when determining that cross-eNodeB decoding is incorrectly performed by the serving eNodeB, sending an incorrect decoded data packet to the at least one non-serving eNodeB of the UE for retransmission combination and decoding.

10. The method according to claim 1, wherein when the result information indicates that the decoding is performed incorrectly by all non-serving eNodeBs that receive the information sent by the UE, the result information comprises information before decoding,
wherein returning, by the serving eNodeB, the feedback message to the UE at least according to the result information comprises:
performing, by the serving eNodeB, cross-eNodeB decoding on the information before decoding when receiving the information before decoding from the non-serving eNodeB;
returning, by the serving eNodeB, a first feedback message indicating correct decoding or a second feedback message indicating incorrect decoding to the UE according to a result of cross-eNodeB decoding on the information before decoding; and
requesting the UE to retransmit the information when the second feedback message is returned to the UE.

11. An information processing method, comprising:
receiving, by a non-serving evolved NodeB (eNodeB), information sent by user equipment (UE);
performing decoding by the non-serving eNodeB on the information received from the UE;
obtaining, by the non-serving eNodeB, result information based on the decoding; and
sending, by the non-serving eNodeB, the result information based on the decoding to a serving eNodeB of the UE, wherein the result information is used by the serving eNodeB to send a feedback message to the UE wherein the feedback message indicates whether the information sent by the UE is decoded correctly or incorrectly.

12. The method according to claim 11, wherein before performing decoding on the information received from the UE, further comprising:
receiving, by the non-serving eNodeB, a notification message indicating a decoding manner, wherein the notification message is sent by the serving eNodeB of the UE;
wherein the performing decoding by the non-serving eNodeB on the information received from the UE is based on the decoding manner.

13. The method according to claim 11, wherein when the decoding is performed correctly on the received information sent by the UE, the result information based on the decoding comprises at least one of: indication information indicating correct decoding performed on the information sent by the UE, and information generated after correct decoding; and
when the decoding is performed incorrectly on the information sent by the UE, the result information based on the decoding comprises at least one of: indication information indicating incorrect decoding performed on the information sent by the UE, and information before decoding.

14. The method according to claim 11, wherein before sending the result information based on the decoding to the servicing eNodeB of the UE, further comprising:
assigning, by the non-serving eNodeB, a priority to the result information based on the decoding;
the sending, by the non-serving eNodeB, the result information based on the decoding to a serving eNodeB of the UE comprises:
sending, by the non-serving eNodeB, the result information based on the decoding to a serving eNodeB of the UE according to the priority.

15. An evolved NodeB (eNodeB), comprising:
a result receiving unit, configured to receive result information based on decoding performed on information sent by a user equipment (UE), wherein the result information is sent by at least one non-serving eNodeB of the UE; and
a feedback returning unit, configured to return a feedback message to the UE according to at least the result information, received by the result receiving unit, based on the decoding performed by the non-serving eNodeB on the information sent by the UE, wherein the feedback message indicates whether the information sent by the UE is decoded correctly or incorrectly.

16. The eNodeB according to claim 15, further comprising:
a receiving decoding unit, configured to receive information sent by the UE and perform decoding on the information sent by the UE; and
a request sending unit, configured to, when the decoding is incorrectly performed by the receiving decoding unit on the information sent by the UE, send a request to the at least one non-serving eNodeB of the UE, and request the non-serving eNodeB to return the result information based on the decoding performed on the information sent by the UE.

17. The eNodeB according to claim 15, further comprising:
a manner selecting and notifying unit, configured to select a decoding manner and notify the non-serving eNodeB of the UE of the decoding manner; wherein
the decoding manner comprises: the non-serving eNodeB forwards the received information sent by the UE to a serving eNodeB for decoding; or the non-serving eNodeB returns the result information based on the decoding performed by the non-serving eNodeB on the information sent by the UE to the serving eNodeB; or
when receiving a request sent by the serving eNodeB, the non-serving eNodeB returns the result information based on the decoding performed by the non-serving eNodeB on the information sent by the UE to the serving eNodeB.

18. The eNodeB according to claim 15, wherein when the result information indicates that the decoding is performed correctly by any non-serving eNodeB, the result information comprises information generated after correct decoding, or, when the result information indicates that the decoding is performed incorrectly by all non-serving eNodeBs that receive the information sent by the UE, the result information comprises information before decoding, wherein the eNodeB further comprises:
an indication message sending unit, configured to send a first indication message, wherein the first indication message indicates to the non-serving eNodeB to discard information generated after correct decoding or discard the information sent by the UE, or indicates to the non-serving eNodeB to forward to the serving eNodeB the information generated after correct decoding or the information sent by the UE, wherein the information generated after correct decoding is generated after the information sent by the UE is decoded by the non-serving eNodeB correctly.

19. The eNodeB according to claim 15, further comprising:
a first indicating unit, configured to send a first indication message to the UE, wherein the first indication message is used to indicate whether multiple cells that currently receive the information sent by the UE are located in the same eNodeB.

20. The eNodeB according to claim 15, further comprising:
a delay indicating unit, configured to send delay indication to the UE when returning the feedback message to the UE is delayed, wherein the delay indication is used to instruct the UE to receive delay information about the feedback message, and the delay information comprises delay time for the UE to receive the feedback message.

* * * * *

UNITED STATES PATENT AND TRADEMARK OFFICE
CERTIFICATE OF CORRECTION

PATENT NO. : 8,817,636 B2  
APPLICATION NO. : 13/283208  
DATED : August 26, 2014  
INVENTOR(S) : Song et al.

Page 1 of 1

It is certified that error appears in the above-identified patent and that said Letters Patent is hereby corrected as shown below:

In the Claims

Claim 4, Column 29, line 29, "non-servin" should read -- non-serving --.

Claim 4, Column 29, line 30, "enerated" should read -- generated --.

Claim 4, Column 29, line 30, "decodin" should read -- decoding --.

Signed and Sealed this
Sixth Day of January, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,817,636 B2 | Page 1 of 1 |
| APPLICATION NO. | : 13/283208 | |
| DATED | : August 26, 2014 | |
| INVENTOR(S) | : Song et al. | |

It is certified that error appears in the above-identified patent and that said Letters Patent is hereby corrected as shown below:

Title page, item (75) inventors, "Jingdong Peng" should read -- Jindong Peng --.

Signed and Sealed this
Fourth Day of August, 2015

Michelle K. Lee
*Director of the United States Patent and Trademark Office*